United States Patent
Adisechan et al.

(10) Patent No.: US 12,144,349 B2
(45) Date of Patent: Nov. 19, 2024

(54) PESTICIDAL MIXTURES COMPRISING A MESOIONIC COMPOUND

(71) Applicant: BASF SE, Ludwigshafen (DE)

(72) Inventors: Ashokkumar Adisechan, Navi Mumbai (IN); Joachim Dickhaut, Ludwigshafen (DE); Olesya Kuzmina, Ludwigshafen (DE); Rizwan Shabbir Shaikh, Navi Mumbai (IN)

(73) Assignee: BASF SE, Ludwigshafen (DE)

( * ) Notice: Subject to any disclaimer, the term of this patent is extended or adjusted under 35 U.S.C. 154(b) by 903 days.

(21) Appl. No.: 17/270,824

(22) PCT Filed: Sep. 9, 2019

(86) PCT No.: PCT/EP2019/073916
§ 371 (c)(1),
(2) Date: Feb. 23, 2021

(87) PCT Pub. No.: WO2020/058010
PCT Pub. Date: Mar. 26, 2020

(65) Prior Publication Data
US 2021/0368794 A1 Dec. 2, 2021

(30) Foreign Application Priority Data

Sep. 19, 2018 (EP) .................. 18195429
Mar. 5, 2019 (EP) .................. 19160724

(51) Int. Cl.
*A01N 43/90* (2006.01)
*A01P 7/04* (2006.01)

(52) U.S. Cl.
CPC .......... *A01N 43/90* (2013.01); *A01P 7/04* (2021.08)

(58) Field of Classification Search
CPC .................. A61N 43/90; A01N 43/90
See application file for complete search history.

(56) References Cited

U.S. PATENT DOCUMENTS 10,464,950 B2   11/2019   Kudo et al.

FOREIGN PATENT DOCUMENTS

| WO | WO-2011/134876 A1 | 11/2011 |
|----|-------------------|---------|
| WO | WO-2012/035011 A1 | 3/2012  |
| WO | WO-2014/167084 A1 | 10/2014 |
| WO | WO-2015/061140 A1 | 4/2015  |
| WO | WO-2016/129684 A1 | 8/2016  |
| WO | WO-2016/180802 A1 | 11/2016 |
| WO | WO-2017/043341 A1 | 3/2017  |
| WO | WO-2018/052136 A1 | 3/2018  |
| WO | WO-2018/141954 A1 | 8/2018  |
| WO | WO-2019/007887 A1 | 1/2019  |
| WO | WO-2019/007888 A1 | 1/2019  |

OTHER PUBLICATIONS

European Search Report for EP Patent Application No. 18195429.8, Issued on Dec. 6, 2018, 4 pages.
International Application No. PCT/EP2019/073916, International Search Report and Written Opinion, mailed Nov. 4, 2019.

*Primary Examiner* — Benjamin J Packard
(74) *Attorney, Agent, or Firm* — MARSHALL, GERSTEIN & BORUN LLP

(57) ABSTRACT

Pesticidal mixtures comprising as active compounds 1) pesticidally active compound A of formula (I) and 2) at least one further compound B selected from compounds B1 to B22 as described in claims and the description.

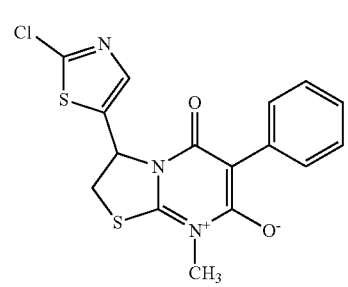

(I)

16 Claims, No Drawings

PESTICIDAL MIXTURES COMPRISING A MESOIONIC COMPOUND

CROSS-REFERENCE TO RELATED APPLICATIONS

This is the U.S. national phase of International Application No. PCT/EP2019/073916, filed Sep. 9, 2019, which claims the benefit of European Patent Application No. 18195429.8, filed on Sep. 19, 2018, and European Patent Application No. 19160724.1, filed Mar. 5, 2019.

Pesticidal mixtures comprising a mesoionic compound

The present invention relates to a pesticidal mixture comprising as active compounds at least one pyrazole compound and at least one further pesticide. Furthermore, the invention relates to methods of applying said mixture.

The present invention thus relates to pesticidal mixtures comprising as active compounds 1) pesticidally active compound A of formula I:

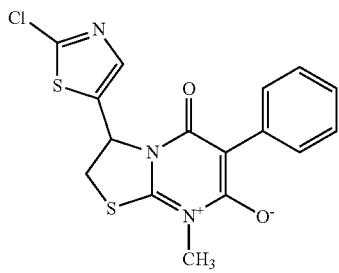

(I)

and
2) at least one further compound B selected from
B1) 2-[3-ethylsulfonyl-6-(trifluoromethyl)midazo[1,2-a]pyridin-2-yl]-3-methyl-6-(trifluoromethyl)midazo[4,5-b]pyridine;
B2) 2-(6-chloro-3-ethylsulfonyl-imidazo[1,2-a]pyridin-2-yl)-3-methyl-6-(trifluoromethyl)imid-azo[4,5-b]pyridine;
B3) 2-(6-bromo-3-ethylsulfonyl-imidazo[1,2-a]pyridin-2-yl)-3-methyl-6-(trifluoromethyl)imid-azo[4,5-b]pyridine;
B4) 2-(3-ethylsulfonyl-6-iodo-imidazo[1,2-a]pyridin-2-yl)-3-methyl-6-(trifluoromethyl)imidazo[4,5-b]pyridine;
B5) 2-(3-ethylsulfonyl-7-iodo-imidazo[1,2-a]pyridin-2-yl)-3-methyl-6-(trifluoromethyl)imidazo[4,5-b]pyridine;
B6) 2-(7-chloro-3-ethylsulfonyl-imidazo[1,2-a]pyridin-2-yl)-3-methyl-6-(trifluoromethyl)imid-azo[4,5-b]pyridine;
B7) 3-ethylsulfonyl-6-iodo-2-[3-methyl-6-(trifluoromethyl)midazo[4,5-b]pyridin-2-yl]imidazo[1,2-a]pyridine-8-carbonitrile;
B8) 2-[3-ethylsulfonyl-8-fluoro-6-(trifluoromethyl)midazo[1,2-a]pyridin-2-yl]-3-methyl-6-(trifluoro-methyl)midazo[4,5-b]pyridine;
B9) 2-[3-ethylsulfonyl-7-(trifluoromethyl)midazo[1,2-a]pyridin-2-yl]-3-methyl-6-(trifluoromethyl-sulfinyl)imidazo[4,5-b]pyridine;
B10) 2-[3-ethylsulfonyl-6-(trifluoromethyl)midazo[1,2-a]pyridin-2-yl]-3-methyl-6-(trifluoromethyl)imidazo[4,5-c]pyridine;
B11) 2-[3-ethylsulfonyl-7-(trifluoromethyl)midazo[1,2-a]pyridin-2-yl]-3-methyl-6-(trifluoromethyl)midazo[4,5-c]pyridine;
B12) 2-[3-ethylsulfonyl-6-(1,2,4-triazol-1-yl)-2-pyridyl]-3-methyl-6-(trifluoromethyl)midazo[4,5-b]pyridine;
B13) 2-[3-ethylsulfonyl-6-(1,2,4-triazol-1-yl)-2-pyridyl]-3-methyl-6-(trifluoromethyl)midazo[4,5-b]pyridine;
B14) 2-[3-ethylsulfonyl-6-[3-(trifluoromethyl)-1,2,4-triazol-1-yl]-2-pyridyl]-3-methyl-6-(trifluoromethyl)imidazo[4,5-b]pyridine;
B15) 2-[3-ethylsulfonyl-5-(trifluoromethyl)-2-pyridyl]-3-methyl-6-(trifluoromethyl)midazo[4,5-b]pyridine; and
B16) 2-[3-ethylsulfonyl-6-(1,2,4-triazol-1-yl)-2-pyridyl]-3-methyl-6-(trifluoromethyl)midazo[4,5-c]pyridine;
B17) 4-chloro-2-[3-ethylsulfonyl-6-(1,2,4-triazol-1-yl)-2-pyridyl]-3-methyl-6-(trifluoromethyl)mid-azo[4,5-c]pyridine;
B18) 2-[3-ethylsulfonyl-6-(1,2,4-triazol-1-yl)-2-pyridyl]-3-methyl-6-(trifluoromethyl)midazo[4,5-c]pyridine-4-carbonitrile;
B19) 2-[3-ethylsulfonyl-6-(1,2,4-triazol-1-yl)-2-pyridyl]-3,4-dimethyl-6-(trifluoromethyl)mid-azo[4,5-c]pyridine;
B20) Tetrachlorantraniliprole;
B21) Tyclopyrazoflor;
B22) N-[[2-fluoro-4-[(2S,3S)-2-hydroxy-3-(3,4,5-trichlorophenyl)-3-(trifluoromethyl)pyrrolidin-1-yl]phenyl]methyl]cyclopropanecarboxamide;

wherein compound A and compound B are present in a weight ratio of from 10000:1 to 1:10000.

The compound of formula (I) are present in two enantiomeric forms I-R-1 and I-S-1 as shown below

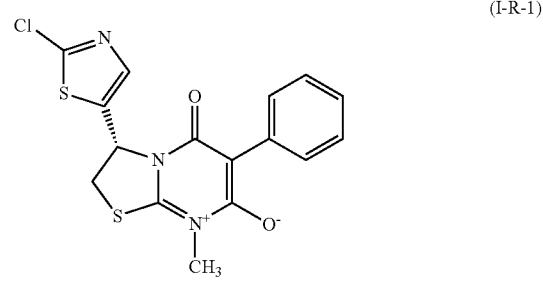

(I-R-1)

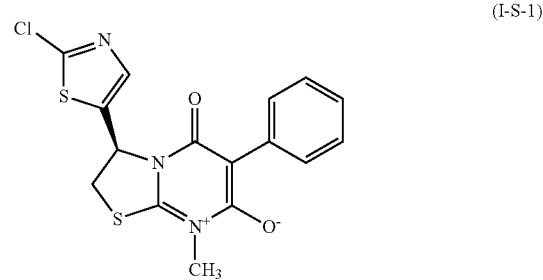

(I-S-1)

The compounds of the formula (I), are present in mesoionic forms. These forms may be expressed in different isoelectronic formulae, each having the formal positive and negative charges on different atoms (as shown below). The present invention extends to all representative isoelectronic structures of compounds of formula I.

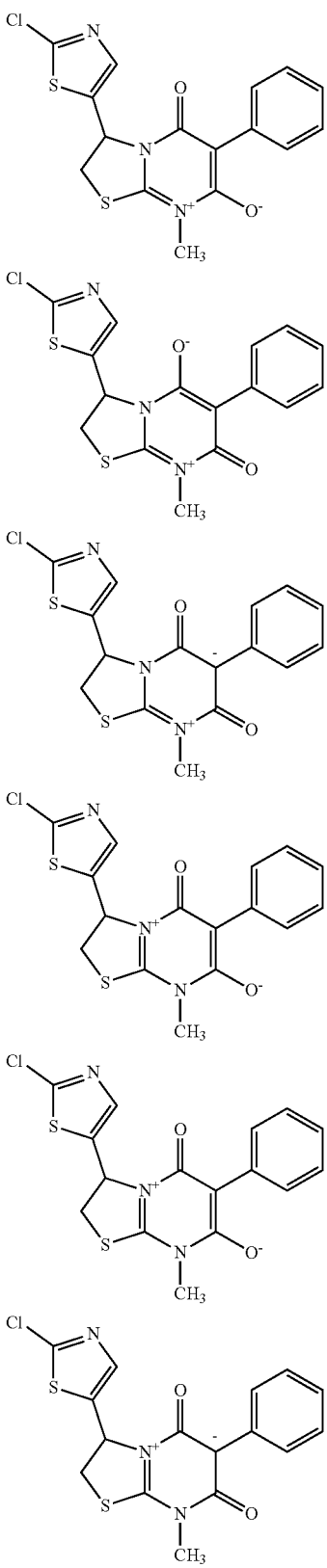 [SMILES: C[n+]1c([O-])c(-c2ccccc2)c(=O)n2c1SCC2c1cnc(Cl)s1 ; C[n+]1c2n(c([O-])c(-c3ccccc3)c1=O)C(c1cnc(Cl)s1)CS2 ; C[n+]1c2n(c(=O)[c-](-c3ccccc3)c1=O)C(c1cnc(Cl)s1)CS2 ; Cn1c([O-])c(-c2ccccc2)c(=O)[n+]2c1SCC2c1cnc(Cl)s1 ; Cn1c([O-])c(-c2ccccc2)c(=O)[n+]2c1SCC2c1cnc(Cl)s1 ; Cn1c2[n+](c(=O)[c-](-c3ccccc3)c1=O)C(c1cnc(Cl)s1)CS2]

The compounds of the formula I-R-1 and I-R-S are also present in mesoionic forms analogus to the compound of formula I as shown above.

The invention relates to a method, in which the compound of formula (I) itself and its stereoisomers, salts, enantiomers or N-oxides, especially its enantiomers, and it mixtures.

The term "non-racemic compound of formula (I)" refers to the compound of formula (I) wherein its R- and S-enantiomers are not present in equal amount.

The term "racemic compound of formula (I)" refers to the compound of formula (I) wherein its R- and S-enantiomers are present in equal amount.

The term "Enantiomeric excess" indicates the excess of an enantiomer in a mixture of enantiomers, and is calculated according to the following formula:

ee=[|m$_1$+m$_2$|/(m$_1$+m$_2$)]×100% ee: enantiomeric excess m$_1$: fraction of enantiomer 1 m$_2$: fraction of enantiomer 2

As used herein and unless otherwise stated, the term "enantiomer" means each individual optically active form of a compound of the invention.

The term "with enantiomeric excess" as used herein refers to a mixture of enantiomers wherein the enantiomer with respect to which the term with "enantiomeric excess" used is present in enantiomeric excees compared to other enantiomer, preferably in an amount of at least 60%, preferably at least 80%, more preferably at least 95%, most preferably at least 98% of the mixture of enantiomers. For example the term "compound of formula I with enantiomeric excess of compound I-R-1" referes to compound of formula I wherein the compound I-R-1 is present in enantiomeric excess amount compared to the compound I-S-1, preferably in an amount of at least 60%, preferably at least 80%, more preferably at least 95%, most preferably at least 98%.

Mesoionic compounds of formula I showing generally pesticidal activity have been described previously. WO2014167084 describes compounds of formula I, their preparation and their use as pest control agents.

The compound of formula I according to the invention can be prepared as described in WO2014/167084. The preparation of the compounds of formula (I) above may lead to them being obtained as isomer mixtures. If desired, these can be resolved by the methods customary for this purpose, such as crystallization or chromatography, also on optically active adsorbate, to give the pure isomers.

Agronomically acceptable salts of the compounds I can be formed in a customary manner, e.g. by reaction with an acid of the anion in question.

Compounds of formula (I) can be prepared analogously to the methods described by Holyoke et al. in WO 2009/099929 (Scheme 1), from appropriately substituted compounds (III).

Scheme 1

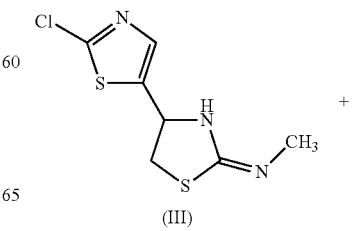

(III)

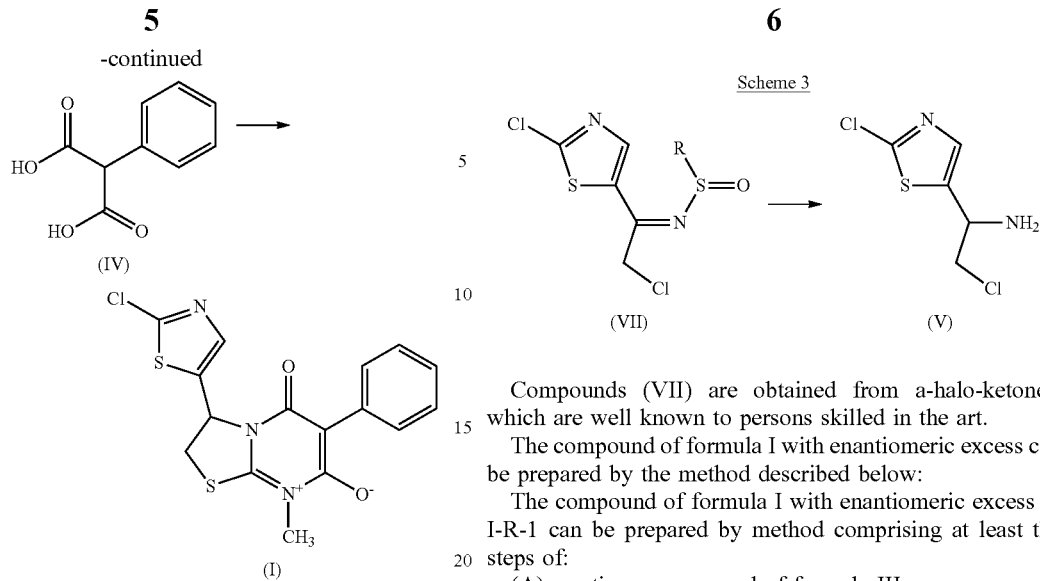

Compounds (III) can be prepared by methods described e.g. by Brian R. Dixon et al in U.S. Pat. No. 6,353,006 from e.g. 2-chloro ethanamines like compound (V), and analogous methods thereto, with appropriately substituted reactants.

Scheme 2

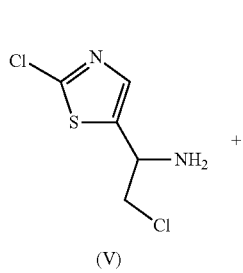

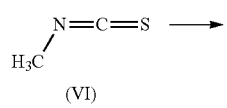

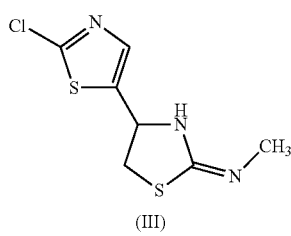

2-Chloro ethanamines compounds (V) in turn are available for example by reduction of sulfinylimines as exemplified in Denolf, Bram et al, Journal of Organic Chemistry, 72(9), 3211-3217; 2007.

Scheme 3

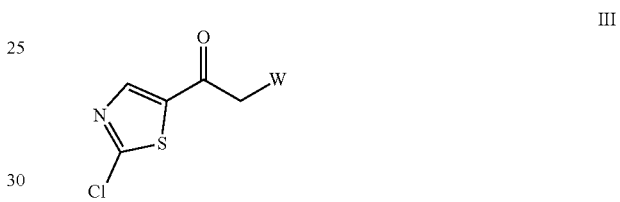

Compounds (VII) are obtained from a-halo-ketones, which are well known to persons skilled in the art.

The compound of formula I with enantiomeric excess can be prepared by the method described below:

The compound of formula I with enantiomeric excess of I-R-1 can be prepared by method comprising at least the steps of:

(A) reacting a compound of formula III,

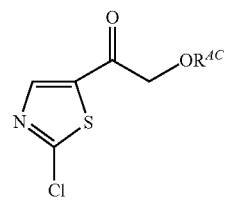

wherein
W is halogen, O-p-toluenesulfonyl, O-methanesulfonyl, or O-trifluoromethanesulfonyl;
with $M^2OR^{AC}$ wherein $M^2$ is selected from lithium, sodium, potassium, aluminium, barium, caesium, calcium, and magnesium; $R^{AC}$ is C(=O)$C_1$-$C_4$-alkyl;
to obtain the compound of formula IV,

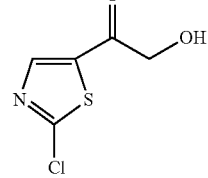

wherein Het and $R^{AC}$ are as defined herein;
(B) hydrolyzing the compound of formula IV as defined herein, in the presence of an acid or a base, to obtain a compound of formula V, wherein Het is as defined in compound of formula IV;

(C) reacting the compound of formula V with $X^2SO_2NH_2$ wherein $X^2$ is halogen, to obtain the compound of formula VI

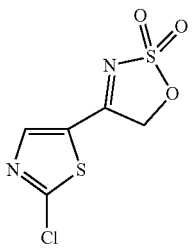

VI (D) hydrogenation of the compound of formula VI, in the presence of a hydrogenation catalyst MXLn, wherein
  M is a transition metal from group VIII to group XII of the periodic table;
  X is an anion;
  Ln is Ln1 or Ln2,
    wherein
    Ln1 is a chiral ligand of the formula Ln1

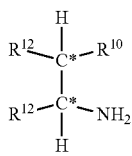

Ln1 wherein
  C* is an asymmetric carbon atom of S or R-configuration;
  $R^{10}$ is OH or $NH-SO_2-R^{11}$; wherein
    $R^{11}$ is aryl unsubstituted or substituted with halogen, $C_1$-$C_{10}$-alkyl, $C_1$-$C_4$-alkoxy, $C_3$-$C_6$-cycloalkyl, $SO_2H$, or $SO_3Na$,
    or
      $C_1$-$C_{10}$-perfluoroalkyl, or $R^{13}R^{14}N$ wherein $R^{13}$ and $R^{14}$ independently represent $C_1$-$C_{10}$-alkyl unsubstituted or substituted with $C_6$-$C_{10}$-aryl, or $R^{13}$ and $R^{14}$ represent a $C_6$-$C_{10}$-cycloalkyl;
    $R^{12}$ independently represents aryl or $C_6$-$C_{10}$-cycloalkyl ring, wherein the ring is unsubstituted or substituted independently of each other with halogen, $C_1$-$C_{10}$-alkyl, $C_1$-$C_4$-alkoxy, $C_3$-$C_6$-cycloalkyl, $SO_3H$, or $SO_3Na$, or both $R^{12}$ are linked together to form a 3- to 6-membered carbocyclic ring or a 5- to 10-membered partially unsaturated carbocyclic ring;
  Ln2 is a chiral phosphorous ligand;
and a hydrogen source selected from a) mixture of $N(R)_3$, wherein R is H or $C_1$-$C_6$-alkyl, and HCOOH, b) HCOONa, and c) mixture of isopropyl alcohol, and t-BuOK or t-BuONa or t-BuOLi;

to obtain a compound of formula VII

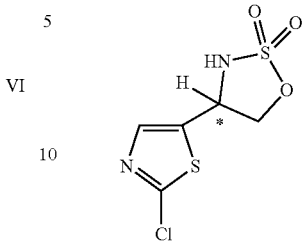

VII wherein
C* is an asymmetric carbon atom of S or R-configuration;
(E) reacting the compound of formula VII,

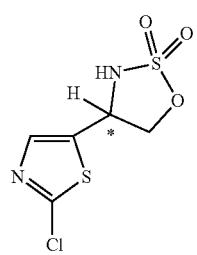

VII wherein
C* is an asymmetric carbon atom of S or R-configuration;
with $CH_3NCS$;
in the presence of a base,
to obtain a compound of formula VIII,

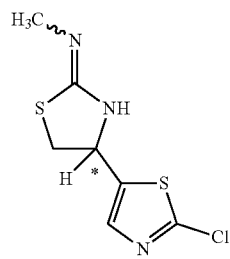

VIII (F) reacting the compound of formula VIII as defined herein, with a compound of formula IX

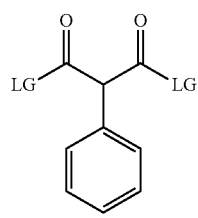

IX wherein,

LG is a leaving group selected from halogen, OR" or SR"; wherein

R" is halogen, $C_1$-$C_6$-alkyl or aryl, which is unsubstituted or substituted with halogen;

to obtain the compound of formula I with enantiomeric excess as defined herein.

In one embodiment of the invention, the compound of formula I is non-racemic;

In one embodiment of the invention, the compound of formula I is the compound I-R-1;

In one embodiment of the invention, the compounds of formula (I) refer to the compound of formula (I) with enantiomeric excess of the compound I-R-1;

In one embodiment of the invention, the compounds of formula (I) refer to the compound of formula (I) with enantiomeric excess of at least 55% of the compound I-R-1;

In another embodiment of the invention, the compounds of formula (I) refer to the compound of formula (I) with enantiomeric excess of at least 60% of the compound I-R-1;

In another embodiment of the invention, the compounds of formula (I) refer to the compound of formula (I) with enantiomeric excess of at least 65% of the compound I-R-1;

In another embodiment of the invention, the compounds of formula (I) refer to the compound of formula (I) with enantiomeric excess of at least 70% of the compound I-R-1;

In another embodiment of the invention, the compounds of formula (I) refer to the compound of formula (I) with enantiomeric excess of at least 75% of the compound I-R-1;

In another embodiment of the invention, the compounds of formula (I) refer to the compound of formula (I) with enantiomeric excess of at least 80% of the compound I-R-1;

In another embodiment of the invention, the compounds of formula (I) refer to the compound of formula (I) with enantiomeric excess of at least 85% of the compound I-R-1;

In a preferred embodiment of the invention, the compounds of formula (I) refer to the compound of formula (I) with enantiomeric excess of at least 90% of the compound I-R-1;

In another preferred embodiment of the invention, the compounds of formula (I) refer to the compound of formula (I) with enantiomeric excess of at least 95% of the compound I-R-1;

In another preferred embodiment of the invention, the compounds of formula (I) refer to the compound of formula (I) with enantiomeric excess of at least 98% of the compound I-R-1;

In another preferred embodiment of the invention, the compounds of formula (I) refer to the compound of formula (I) with enantiomeric excess of at least 99% of the compound I-R-1;

In one embodiment of the invention, the compounds of formula (I) refer to the compound of formula (I) with enantiomeric excess of the compound I-R-1, wherein the compound I-R-1 is present in an amount from ≥55% to ≤100% and the compound I-S-1 is present in an amount from ≤45% to ≥0%;

In another embodiment of the invention, the compounds of formula (I) refer to the compound of formula (I) with enantiomeric excess of the compound I-R-1, wherein the the compound I-R-1 is present in an amount from ≥60% to ≤00% and the compound I-S-1 is present in an amount from ≤40% to ≥0%;

In another embodiment of the invention, the compounds of formula (I) refer to the compound of formula (I) with enantiomeric excess of the compound I-R-1, wherein the the compound I-R-1 is present in an amount from ≥65% to ≤100% and the compound I-S-1 is present in an amount from ≤35% to ≥0%;

In another embodiment of the invention, the compounds of formula (I) refer to the compound of formula (I) with enantiomeric excess of the compound I-R-1, wherein the the compound I-R-1 is present in an amount from ≥70% to ≤100% and the compound I-S-1 is present in an amount from ≤30% to ≥0%;

In another embodiment of the invention, the compounds of formula (I) refer to the compound of formula (I) with enantiomeric excess of the compound I-R-1, wherein the the compound I-R-1 is present in an amount from ≥75% to ≤100% and the compound I-S-1 is present in an amount from ≤25% to ≥0%;

In another embodiment of the invention, the compounds of formula (I) refer to the compound of formula (I) with enantiomeric excess of the compound I-R-1, wherein the the compound I-R-1 is present in an amount from ≥80% to ≤100% and the compound I-S-1 is present in an amount from ≤20% to ≥0%;

In another embodiment of the invention, the compounds of formula (I) refer to the compound of formula (I) with enantiomeric excess of the compound I-R-1, wherein the compound I-R-1 is present in an amount from ≥85% to ≤100% and the compound I-S-1 is present in an amount from ≤15% to ≥0%;

In another embodiment of the invention, the compounds of formula (I) refer to the compound of formula (I) with enantiomeric excess of the compound I-R-1, wherein the the compound I-R-1 is present in an amount from ≥90% to ≤100% and the compound I-S-1 is present in an amount from ≤10% to ≥0%;

In another embodiment of the invention, the compounds of formula (I) refer to the compound of formula (I) with enantiomeric excess of the compound I-R-1, wherein the the compound I-R-1 is present in an amount from ≥95% to ≤100% and the compound I-S-1 is present in an amount from ≤5% to ≥0%;

In another embodiment of the invention, the compounds of formula (I) refer to the compound of formula (I) with enantiomeric excess of the compound I-R-1, wherein the the compound I-R-1 is present in an amount from ≥98% to ≤100%, preferably ≥99% to ≤100%, and the compound I-S-1 is present in an amount from ≤2% to ≥0%, preferably ≤1% to ≥0%;

The "compound of formula I" as well "compound of formula I-R-1 ", or "compound of formula I with enantiomeric excess of compound I-R-1", and the terms "compound (s) for methods according to the (present) invention", "compound(s) according to the (present) invention" or which all compound(s) are applied in methods and uses according to the present invention comprise the compound(s) as defined herein as well as a known stereoisomer, salt, tautomer or N-oxide thereof (including a polymorphic crystalline form, a co-crystal or a solvate of a compound or a stereoisomer, salt, tautomer or N-oxide thereof).

The compound A in the pesticidal mixtures of the present invention is application of the compound of formula I or the non-racemic compound of formula I or the compound of formula I with enantiomeric excess of compound I-R-1 or the compound I-R-1;

One typical problem arising in the field of pest control lies in the need to reduce the dosage rates of the active ingredient in order to reduce or avoid unfavorable environmental or toxicological effects whilst still allowing effective pest control. Another problem encountered concerns the need to have available pest control agents which are effective against a broad spectrum of pests.

Another difficulty in relation to the use of pesticides is that the repeated and exclusive application of an individual pesticidal compound leads in many cases to a rapid selection of pests which have developed natural or adapted resistance against the active compound in question. Therefore there is a need for pest control agents that help prevent or overcome resistance.

It is therefore an object of the present invention to provide pesticidal mixtures and/or compounds which solves at least one of the discussed problems as reducing the dosage rate, enhancing the spectrum of activity or combining knockdown activity with prolonged control or as to resistance management.

It has been found that at least one of these objectives is achieved by the combination of active compounds defined in the outset.

Moreover, it has also been found that simultaneous, that is joint or separate, application of one or more active compounds A and one or more active compounds B or successive application of one or more active compounds A and one or more active compounds B allows enhanced control of pests compared to the control rates that are possible with the individual compounds.

Moreover, the present invention relates to
- a composition comprising the pesticidal mixture as defined herein and at least one inert liquid and/or solid acceptable carrier;
- an agricultural composition comprising the pesticidal mixture as defined herein and at least one inert liquid and/or solid acceptable carrier;
- a method for controlling or combating invertebrate pests, comprising contacting said pest or its food supply, habitat, breeding grounds with a pesticidally effective amount of the pesticidal mixture as defined herein;
- a method of protecting plants from attack or infestation by invertebrate pests, contacting a plant, a plant propagation material or soil or water in which the plant is growing, with a pesticidally effective amount of the pesticidal mixture as defined herein;
- a plant propagation material comprising the pesticidal mixture as defined herein in an amount of from 0.1 g to 10 kg per 100 kg of seed;
- a method for protection of plant propagation material comprising contacting the plant propagation material with the pesticidal mixture as defined herein in an amount of from 0.1 g to 10 kg per 100 kg of plant propagation material;
- the use of the pesticidal mixture as defined herein for protecting growing plants or plant propagation material from attack or infestation by invertebrate pests;
- a method for controlling phytopathogenic harmful fungi, wherein the fungi, their habitat or the plants to be protected against fungal attack, the soil or seed are treated with an effective amount of the pesticidal mixture comprising at least one compound A i.e. application of the compound of formula I or the compound of formula I with enantiomeric excess of compound I-R-1 or the compound I-R-1 as defined herein and at least one specific compound B as defined herein;
- a method for protecting plants from phytopathogenic harmful fungi, wherein the fungi, their habitat or the plants to be protected against fungal attack, the soil or seed are treated with an effective amount of the pesticidal mixture comprising at least one compound A i.e. application of the compound of formula I or the compound of formula I with enantiomeric excess of compound I-R-1 or the compound I-R-1 as defined herein and at least one specific compound B as defined herein;
- a method for protecting animals against infestation or infection by parasites which comprises administering to the animals a parasitically effective amount of the pesticidal mixture as defined herein;
- a method for treating animals infested or infected by parasites which comprises administering to the animals a parasitically effective amount of the pesticidal mixture as defined herein to the animal in need thereof; and
- the use of the pesticidal mixture as defined herein for combating parasites in and on animals.

The mixture according to the invention may be a physical mixture of the at least one compound A and the at least one compound B. Accordingly, the invention also provides a mixture comprising at least one compound A and at least one compound B. However, the composition may also be any combination of at least one compound A with at least one compound B, it not being required for compounds A and B to be present together in the same formulation.

An example of a composition according to the invention or to be used according to the invention in which the at least one compound A and the at least one compound B are not present together in the same formulation is a combipack. In a combipack, two or more components of a combipack are packaged separately, i.e., not jointly pre-formulated. As such, combipacks include one or more separate containers such as vials, cans, bottles, pouches, bags or canisters, each container containing a separate component for an agrochemical composition. One example is a two-component combipack. Accordingly the present invention also relates to a two-component combipack, comprising a first component which in turn comprises at least one compound A, a liquid or solid carrier and, if appropriate, at least one surfactant and/or at least one customary auxiliary, and a second component which in turn comprises at least one compound B, a liquid or solid carrier and, if appropriate, at least one surfactant and/or at least one customary auxiliary. More details, e.g. as to suitable liquid and solid carriers, surfactants and customary auxiliaries are described below.

The "combined" use of at least one compound A i.e. the compound of formula I or the compound of formula I with enantiomeric excess of compound I-R-1 or the compound I-R-1 "in combination with" at least one compound B on the one hand can be understood as using a physical mixture of at least one compound A i.e. the compound of formula I or the compound of formula I with enantiomeric excess of compound I-R-1 or the compound I-R-1, and at least one compound B. On the other hand, the combined use may also consist in using the at least one compound A i.e. the compound of formula I or the compound of formula I with enantiomeric excess of compound I-R-1 or the compound I-R-1, and the at least one compound B separately, but within a sufficiently short time of one another so that the desired effect can take place. More detailed illustrations of the combined use can be found in the specifications below.

The term "invertebrate pest" (also referred to as animal pests) as used herein encompasses animal populations, such as insects, arachnids and nematodes, which may attack plants, thereby causing substantial damage to the plants attacked, as well as ectoparasites which may infest animals, in particular warm blooded animals such as e.g. mammals or birds, or other higher animals such as reptiles, amphibians or fish, thereby causing substantial damage to the animals infested.

The term "compound(s) of the present invention" is to be understood as equivalent to the term "compound(s) according to the invention", therefore also comprising a stereoisomer, salt, tautomer or N-oxide thereof.

The term "stereoisomers" encompasses both optical isomers, such as enantiomers or diastereomers, the latter existing due to more than one center of chirality in the molecule, as well as geometrical isomers (cisitrans isomers).

Depending on the substitution pattern, the compounds of formula I may have one or more centers of chirality, in which case they are present as mixtures of enantiomers or diastereomers. The invention provides both the pure enantiomers or diastereomers and their mixtures and the use according to the invention of the pure enantiomers or diastereomers of the compound I or its mixtures. Suitable compounds of the formula I also include all possible geometrical stereoisomers (cisitrans isomers) and mixtures thereof.

The term "N-oxide" relates to a form of compounds I in which at least one nitrogen atom is present in oxidized form (as NO).

The compounds of the invention may be amorphous or may exist in one or more different crystalline states (polymorphs) which may have a different macroscopic properties such as stability or show different biological properties such as activities. The present invention includes both amorphous and crystalline compounds of the formula I, mixtures of different crystalline states of the respective compound I, as well as amorphous or crystalline salts thereof.

Salts of the compounds of the formula I are preferably agriculturally and veterinarily acceptable salts. They can be formed in a customary method, e.g. by reacting the compound with an acid of the anion in question if the compound of formula I has a basic functionality or by reacting an acidic compound of formula I with a suitable base.

Suitable agriculturally acceptable salts are especially the salts of those cations or the acid addition salts of those acids whose cations and anions, respectively, do not have any adverse effect on the action of the compounds according to the present invention. Suitable cations are in particular the ions of the alkali metals, preferably lithium, sodium and potassium, of the alkaline earth metals, preferably calcium, magnesium and barium, and of the transition metals, preferably manganese, copper, zinc and iron, and also ammonium ($NH_4^+$) and substituted ammonium in which one to four of the hydrogen atoms are replaced by $C_1$-$C_4$-alkyl, $C_1$-$C_4$-hydroxyalkyl, $C_1$-$C_4$-alkoxy, $C_1$-$C_4$-alkoxy-$C_1$-$C_4$-alkyl, hydroxy-$C_1$-$C_4$-alkoxy-$C_1$-$C_4$-alkyl, phenyl or benzyl. Examples of substituted ammonium ions comprise methylammonium, isopropylammonium, dimethylammonium, diisopropylammonium, trimethylammonium, tetramethylammonium, tetraethylammonium, tetrabutylammonium, 2-hydroxyethylammonium, 2-(2-hydroxyethoxy) ethylammonium, bis(2-hydroxyethyl)ammonium, benzyltrimethylammonium and benzl-triethylammonium, furthermore phosphonium ions, sulfonium ions, preferably tri($C_1$-$C_4$-alkyl)sulfonium, and sulfoxonium ions, preferably tri($C_1$-$C_4$-alkyl)sulfoxonium.

Anions of useful acid addition salts are primarily chloride, bromide, fluoride, hydrogen sulfate, sulfate, dihydrogen phosphate, hydrogen phosphate, phosphate, nitrate, hydrogen carbonate, carbonate, hexafluorosilicate, hexafluorophosphate, benzoate, and the anions of $C_1$-$C_4$-alkanoic acids, preferably formate, acetate, propionate and butyrate. They can be formed by reacting a compound of formulae I with an acid of the corresponding anion, preferably of hydrochloric acid, hydrobromic acid, sulfuric acid, phosphoric acid or nitric acid.

The commercially available further compounds B may be found in the Pesticide Manual, 17$^{th}$ Edition, British Crop Protection Council (2015), among other publications, and its online database.

The compounds B1 and B10, and their pesticidal action are known from WO2016129684, JP20160186572. The compounds B2 to B9 and B11 and B12, and their pesticidal action are known from WO2018/052136. The compounds B13 and B14, and their pesticidal action are known from WO2015133603, WO2017043341. The compound B15 and its pesticidal action is known from WO2014125651. The compounds B16, B17, B18, B19 and their pesticidal action is known from WO2018141954. The compound B20 (CAS number-1104384-14-6) and its pesticidal action is known from CN101333213, WO20103350. The compound B21 (CAS number-1477919-27-9) and its pesticidal action is known from WO201Si125S20, the compound B22 and its pesticidal action is known from WO2019007888 and WO2019007887.

We have found that simultaneous, that is joint or separate, application of at least one compound of formula I or the compound of formula I with enantiomeric excess of compound I-R-1 or the compound I-R-1, and at least one compound B or successive application of at least one of compound of formula I or the compound of formula I with enantiomeric excess of compound I-R-1 or the compound I-R-1, and at least one compound B allows better control of animal pests than is possible with the individual compounds alone (synergistic mixtures).

The compound of formula I or the compound of formula I with enantiomeric excess of compound I-R-1 or the compound I-R-1, can be used as synergists for a large number of different fungicidal active compounds. By simultaneous, that is joint or separate, application of compound of formula I or the compound of formula I with enantiomeric excess of compound I-R-1 or the compound I-R-1, with at least one active compound B, the fungicidal and/or insecticidal activity, resp., is increased in a superadditive manner.

The compound of formula I or the compound of formula I with enantiomeric excess of compound I-R-1 or the compound I-R-1, can be present in different crystal modifications, which may differ in biological activity.

The remarks made below as to preferred embodiments of the variables (substituents) of the compounds of formula I are valid on their own as well as preferably in combination with each other, as well as in combination with the stereoisomers, salts, tautomers or N-oxides thereof.

The remarks made below concerning preferred embodiments of the variables further are valid on their own as well as preferably in combination with each other concerning the compounds of formula I, where applicable, as well as concerning the uses and methods according to the invention and the mixtures according to the invention.

In one preferred embodiment, the compound B is selected from B1 to B19;

In one preferred embodiment, the compound B is selected from B1 to B11;

In one preferred embodiment, the compound B is selected from B1 to B9;

In one preferred embodiment, the compound B is selected from B13 to B19;

In another preferred embodiment, the compound B is selected from B3 to B9;

In another preferred embodiment, the compound B is B1 or B10;
In another preferred embodiment, the compound B is B1 or B2;
In another preferred embodiment, the compound B is B3 or B4;
In another preferred embodiment, the compound B is B20 or B21;
In another preferred embodiment, the compound B is B20 or B22;
In another preferred embodiment, the compound B is B22;
In another preferred embodiment, the compound B is selected from B6 to B9;
In another preferred embodiment, the compound B is B1;
In another preferred embodiment, the compound B is B2;
In another preferred embodiment, the compound B is B3;
In another preferred embodiment, the compound B is B4;
In another preferred embodiment, the compound B is B5;
In another preferred embodiment, the compound B is B6;
In another preferred embodiment, the compound B is B7;
In another preferred embodiment, the compound B is B8;
In another preferred embodiment, the compound B is B9;
In another preferred embodiment, the compound B is B10;
In another preferred embodiment, the compound B is B11;
In another preferred embodiment, the compound B is B12;
In another preferred embodiment, the compound B is B13;
In another preferred embodiment, the compound B is B14;
In another preferred embodiment, the compound B is B15;
In another preferred embodiment, the compound B is B16;
In another preferred embodiment, the compound B is B17;
In another preferred embodiment, the compound B is B18;
In another preferred embodiment, the compound B is B19;
In another preferred embodiment, the compound B is B20;
In another preferred embodiment, the compound B is B21;
In another preferred embodiment, the compound B is B22;

A preferred embodiment of the invention relates to pesticidal mixtures wherein component A is selected from compounds I-1 to 1-3:
(I-1): Racemic compound of formula I,
(1-2): Compound of formula I-R-1, and
(1-3): Compound of formula 1 with enantiomeric excess of the compound I-R-1, wherein the the compound I-R-1 is present in an amount from >98% to <100%, and the compound I-S-1 is present in an amount from <2% to >0%.

Preferred mixtures comprising compound A and compound B are the combinations listed in Table A:

| No. | Compound A | CompoundB |
|---|---|---|
| A-1. | I-1 | B1 |
| A-2. | I-2 | B1 |
| A-3. | I-3 | B1 |

-continued

| No. | Compound A | CompoundB |
|---|---|---|
| A-4. | I-1 | B2 |
| A-5. | I-2 | B2 |
| A-6. | I-3 | B2 |
| A-7. | I-1 | B3 |
| A-8. | I-2 | B3 |
| A-9. | I-3 | B3 |
| A-10. | I-1 | B4 |
| A-11. | I-2 | B4 |
| A-12. | I-3 | B4 |
| A-13. | I-1 | B5 |
| A-14. | I-2 | B5 |
| A-15. | I-3 | B5 |
| A-16. | I-1 | B6 |
| A-17. | I-2 | B6 |
| A-18. | I-3 | B6 |
| A-19. | I-1 | B7 |
| A-20. | I-2 | B7 |
| A-21. | I-3 | B7 |
| A-22. | I-1 | B8 |
| A-23. | I-2 | B8 |
| A-24. | I-3 | B8 |
| A-25. | I-1 | B9 |
| A-26. | I-2 | B9 |
| A-27. | I-3 | B9 |
| A-28. | I-1 | B10 |
| A-29. | I-2 | B10 |
| A-30. | I-3 | B10 |
| A-31. | I-1 | B11 |
| A-32. | I-2 | B11 |
| A-33. | I-3 | B11 |
| A-34. | I-1 | B12 |
| A-35. | I-2 | B12 |
| A-36. | I-3 | B12 |
| A-37. | I-1 | B13 |
| A-38. | I-2 | B13 |
| A-39. | I-3 | B13 |
| A-40. | I-1 | B14 |
| A-41. | I-2 | B14 |
| A-42. | I-3 | B14 |
| A-43. | I-1 | B15 |
| A-44. | I-2 | B15 |
| A-45. | I-3 | B15 |
| A-46. | I-1 | B16 |
| A-47. | I-2 | B16 |
| A-48. | I-3 | B16 |
| A-49. | I-1 | B17 |
| A-50. | I-2 | B17 |
| A-51. | I-3 | B17 |
| A-52. | I-1 | B18 |
| A-53. | I-2 | B18 |
| A-54. | I-3 | B18 |
| A-55. | I-1 | B19 |
| A-56. | I-2 | B19 |
| A-57. | I-3 | B19 |
| A-58. | I-1 | B20 |
| A-59. | I-2 | B20 |
| A-60. | I-3 | B20 |
| A-61. | I-1 | B21 |
| A-62. | I-2 | B21 |
| A-63. | I-3 | B21 |
| A-64. | I-1 | B22 |
| A-65. | I-2 | B22 |
| A-66. | I-3 | B22 |

Perticularly preferred pesticidal mixtures are A-1 to A-66;
In a preferred embodiment of the invention, the pesticidal mixtures are A-1 to A-33;
In more preferred embodiment of the invention, the pesticidal mixtures are selected from A-1 to A-3 and A-28 to A-30;
Also in more preferred embodiment of the invention, the pesticidal mixtures are A-1 to A-3;
Also in more preferred embodiment of the invention, the pesticidal mixtures are A-28 to A-30;
In another preferred embodiment of the invention, the pesticidal mixtures are A-31 to A-33;

In another preferred embodiment of the invention, the pesticidal mixtures are A-37 to A-53;

In more preferred embodiment of the invention, the pesticidal mixtures are A-7 to A-9;

Also in more preferred embodiment of the invention, the pesticidal mixtures are A-10 to A-12;

Also in more preferred embodiment of the invention, the pesticidal mixtures are A-13 to A-15;

Also in more preferred embodiment of the invention, the pesticidal mixtures are A-16 to A-18;

Also in more preferred embodiment of the invention, the pesticidal mixtures are A-19 to A-21;

Also in more preferred embodiment of the invention, the pesticidal mixtures are A-22 to A-24;

Also in more preferred embodiment of the invention, the pesticidal mixtures are A-25 to A-27;

Also in more preferred embodiment of the invention, the pesticidal mixtures are A-58 to A-60;

In another preferred embodiment of the invention, the pesticidal mixtures are A-61 to A-63; In another preferred embodiment of the invention, the pesticidal mixtures are A-64 to A-66;

Binary mixtures of a compound of formula I or the compound of formula I with enantiomeric excess of compound I-R-1 or the compound I-R-1, and a compound B are one preferred embodiment of the invention.

A further embodiment of the invention relates to mixtures of a at least a compound A and at least a compound B, particularly to any one of mixtures A-1 to A-66, containing additionally at least a further insecticide.

A further embodiment of the invention relates to any one of mixtures A-1 to A-66, containing additionally at least a fungicide C from the groups F1 to F11.

F1) Respiration inhibitors

Inhibitors of complex III at $Q_o$ site (e.g. strobilurins): azoxystrobin (F1.1.1), coumethoxystrobin (F1.1.2), coumoxystrobin (F1.1.3), dimoxystrobin (F1.1.4), enestroburin (F1.1.5), fenaminstrobin (F1.1.6), fenoxystrobiniflufenoxystrobin (F1.1.7), fluoxastrobin (F1.1.8), kresoximmethyl (F1.1.9), mandestrobin (F1.1.10), metominostrobin (F1.1.11), orysastrobin (F1.1.12), picoxystrobin (F1.1.13), pyraclostrobin (F1.1.14), pyrametostrobin (F1.1.15), pyraoxystrobin (F1.1.16), trifloxystrobin (F1.1.17), 2-(2-(3-(2,6-dichlorophenyl)-1-methyl-allylideneaminooxy-methyl)-phenyl)-2-methoxyimino-N-methyl-acetamide (F1.1.18), pyribencarb (F1.1.19), triclo-pyricarb/chlorodincarb (F1.1.20), famoxadone (F1.1.21), fenamidone (F1.1.21), methyl-N-[2-[(1,4-dimethyl-5-phenyl-pyrazol-3-yl)oxylmethyl]phenyl]-N-methoxy-carbamate (F1.1.22), 1-[3-chloro-2-[[1-(4-chlorophenyl)-1H-pyrazol-3-yl]oxymethyl]phenyl]-4-methyl-tetrazol-5-one (F1.1.23), 1-[3-bromo-2-[[1-(4-chlorophenyl)pyrazol-3-yl]oxymethyl]phenyl]-4-methyl-tetrazol-5-one (F1.1.24), 1-[2-[[1-(4-chlorophenyl)pyrazol-3-yl]oxymethyl]-3-methyl-phenyl]-4-methyl-te-trazol-5-one (F1.1.25), 1-[2-[[1-(4-chlorophenyl)pyrazol-3-yl]oxymethyl]-3-fluoro-phenyl]-4-methyl-tetrazol-5-one (F1.1.26), 1-[2-[[1-(2,4-dichlorophenyl)pyrazol-3-yl]oxymethyl]-3-fluoro-phenyl]-4-methyl-tetrazol-5-one (F1.1.27), 1-[2-[[4-(4-chlorophenyl)thiazol-2-yl]oxymethyl]-3-methyl-phenyl]-4-methyl-tetrazol-5-one (A.1.28), 1-[3-chloro-2-[[4-(p-tolyl)thiazol-2-yl]oxymethyl]-4-methyl-tetrazol-5-one (F1.1.29), 1-[3-cyclopropyl-2-[[2-methyl-4-(1-methylpyrazol-3-yl)phenoxy]methyl] phenyl]-4-methyl-tetrazol-5-one (F1.1.30), 1-[3-(difluoromethoxy)-2-[[2-methyl-4-(1-methylpyrazol-3-yl)phenoxy]methyl]phenyl]-4-methyl-tetrazol-5-one (F1.1.31), 1-methyl-4-[3-methyl-2-[[2-methyl-4-(1-methylpyrazol-3-yl)phenoxy]methyl]phenyl]tetrazol-5-one (F1.1.32), 1-methyl-4-[3-methyl-2-[[1[3-(trifluoromethyl)phenyl]]ethylideneamino]oxymethyl] phenyl]tetrazol-5-one (F1.1.33), (Z,2E)-5-[1-(2,4-dichlorophenyl)pyrazol-3-yl]oxy-2-methoxyimino-N, 3-dimethyl-pent-3-enamide (F1.1.34), (Z,2E)-5-[1-(4-chlorophenyl)pyrazol-3-yl]oxy-2-methoxyimino-N,3-dimethyl-pent-3-enamide (F1.1.35), (Z,2E)-5-[1-(4-chloro-2-fluoro-phenyl)pyrazol-3-yl]oxy-2-methoxyimino-N,3-dimethyl-pent-3-enamide (F1.1.36), inhibitors of complex III at $Q_i$ site: cyazofamid (F1.2.1), amisulbrom (F1.2.2), [(3S,6S,7R,8R)-8-benzyl-3-[(3-acetoxy-4-methoxy-pyridine-2-carbonyl)amino]-6-methyl-4,9-dioxo-1,5-dioxonan-7-yl] 2-methylpropanoate (F1.2.3), [(3S,6S,7R,8R)-8-benzyl-3-[[3-(acetoxymethoxy)-4-methoxy-pyridine-2-carbonyl] amino]-6-methyl-4,9-dioxo-1,5-dioxonan-7-yl] 2-methylpropanoate (F1.2.4), [(3S,6S,7R,8R)-8-benzyl-3-[(3-isobutoxycarbonyloxy-4-methoxy-pyridine-2-carbonyl)amino]-6-methyl-4,9-dioxo-1,5-dioxonan-7-yl] 2-methylpropanoate (F1.2.5), [(3S,6S,7R,8R)-8-benzyl-3-[[3-(1,3-benzodioxol-5-ylmethoxy)-4-methoxy-pyridine-2-carbonyl]amino]-6-methyl-4,9-dioxo-1,5-dioxonan-7-yl] 2-methylpropanoate (F1.2.6); (3S,6S,7R,8R)-3-[[(3-hydroxy-4-methoxy-2-pyridinyl)carbonyl]amino]-6-methyl-4,9-dioxo-8-(phenylmethyl)-1,5-dioxonan-7-yl2-methylpropanoate (F1.2.7), (3S,6S,7R,8R)-8-benzyl-3-[3-[(isobutyryloxy)methoxy]-4-methoxypicolinamido]-6-methyl-4, 9-dioxo-1,5-dioxonan-7-yl isobutyrate (F1.2.8);

inhibitors of complex II (e.g. carboxamides): benodanil (F1.3.1), benzovindiflupyr (F1.3.2), bixafen (F1.3.3), boscalid (F1.3.4), carboxin (F1.3.5), fenfuram (F1.3.6), fluopyram (F1.3.7), flutolanil (F1.3.8), fluxapyroxad (F1.3.9), furametpyr (F1.3.10), isofetamid (F1.3.11), isopyrazam (F1.3.12), mepronil (F1.3.13), oxycarboxin (F1.3.14), penflufen (F1.3.14), penthiopyrad (F1.3.15), sedaxane (F1.3.16), tecloftalam (F1.3.17), thifluzamide (F1.3.18), N-(4'-trifluoromethylthiobiphenyl-2-yl)-3-difluoromethyl-1-methyl-1H-pyrazole-4-carboxamide (F1.3.19), N-(2-(1,3,3-trimethyl-butyl)-phenyl)-1,3-dimethyl-5-fluoro-1H-pyrazole-4-carboxamide (F1.3.20), 3-(difluoromethyl)-1-methyl-N-(1,1,3-trimethylindan-4-yl)pyrazole-4-carboxamide (F1.3.21), 3-(trifluoromethyl)-1-methyl-N-(1,1,3-trimethylindan-4-yl)pyrazole-4-carboxamide (F1.3.22), 1,3-dimethyl-N-(1,1,3-trimethylindan-4-yl)pyrazole-4-carboxamide (F1.3.23), 3-(trifluoromethyl)-1,5-dimethyl-N-(1,1,3-trimethylindan-4-yl)pyrazole-4-carboxamide (F1.3.24), 1,3,5-trimethyl-N-(1,1,3-trimethylindan-4-yl)pyrazole-4-carboxamide (F1.3.25), N-(7-fluoro-1,1,3-trimethylindan-4-yl)-1,3-dimethyl-pyrazole-4-carboxamide (F1.3.26), N-[2-(2,4-dichlorophenyl)-2-methoxy-1-methyl-ethyl]-3-(difluoromethyl)-1-methyl-pyrazole-4-carboxamide (F1.3.27);

other respiration inhibitors (e.g. complex I, uncouplers): diflumetorim (F1.4.1), (5,8-difluoroquinazolin-4-yl)-{2-[2-fluoro-4-(4-trifluoromethylpyridin-2-yloxy)-phenyl]ethyl}-amine (F1.4.2); nitrophenyl derivates: binapacryl (F1.4.3), dinobuton (F1.4.4), dinocap (F1.4.5), fluazinam (F1.4.6); ferimzone (F1.4.7); organometal compounds: fentin salts, such as fentin-acetate (F1.4.8), fentin chloride (F1.4.9) or fentin hydroxide (F1.4.10); ametoctradin (F1.4.11); and silthiofam (F1.4.12);

F2) Sterol biosynthesis inhibitors (SBI fungicides)

C14 demethylase inhibitors (DMI fungicides): triazoles: azaconazole (F2.1.1), bitertanol (F2.1.2), bromuconazole (F2.1.3), cyproconazole (F2.1.4), difenoconazole (F2.1.5), diniconazole (F2.1.6), diniconazole-M (F2.1.7), epoxiconazole (F2.1.8), fenbuconazole (F2.1.9), fluquinconazole (F2.1.10), flusilazole (F2.1.11), flutriafol (F2.1.12), hexaconazole (F2.1.13), imibenconazole (F2.1.14), ipconazole (F2.1.15), metconazole (F2.1.17), myclobutanil (F2.1.18), oxpoconazole (F2.1.19), paclobutrazole (F2.1.20), penconazole (F2.1.21), propiconazole (F2.1.22), prothioconazole (F2.1.23), simeconazole (F2.1.24), tebuconazole (F2.1.25), tetraconazole (F2.1.26), triadimefon (F2.1.27), triadimenol (F2.1.28), triticonazole (F2.1.29), uniconazole (F2.1.30), 1-[rel-(2S,3k)-3-(2-chlorophenyl)-2-(2,4-difluorophenyl)-oxiranylmethyl]-5-thiocyanato-1H-[1,2,4]triazolo (F2.1.31), 2-[rel-(2S;3R)-3-(2-chlorophenyl)-2-(2,4-difluorophenyl)-oxiranylmethyl]-2H-[2,4]triazole-3-thiol (B.1.32); imidazoles: imazalil (F2.1.42), pefurazoate (F2.1.43), prochloraz (F2.1.44), triflum/zol (F2.1.45); pyrimidines, pyridines and piperazines: fenarimol (F2.1.46), nuarimol (F2.1.47), pyrifenox (F2.1.48), triforine (F2.1.49), [3-(4-chloro-2-fluoro-phenyl)-5-(2,4-difluorophenypisoxazol-4-yl]-(3-pyridyl)methanol (F2.1.50);

Delta14-reductase inhibitors: aldimorph (F2.2.1), dodemorph (F2.2.2), dodemorph-acetate (F2.2.3), fenpropimorph (F2.2.4), tridemorph (F2.2.5), fenpropidin (F2.2.6), piperalin (F2.2.7), spiroxamine (F2.2.8);

Inhibitors of 3-keto reductase: fenhexamid (F2.3.1);

F3) Nucleic acid synthesis inhibitors phenylamides or acyl amino acid fungicides: benalaxyl (F3.1.1), benalaxyl-M (F3.1.2), kiralaxyl (F3.1.3), metalaxyl (F3.1.4), metalaxyl-M (mefenoxam, F3.1.5), ofurace (F3.1.6), oxadixyl (F3.1.7);

others: hymexazole (F3.2.1), octhilinone (F3.2.2), oxolinic acid (F3.2.3), bupirimate (F3.2.4), 5-fluorocytosine (F3.2.5), 5-fluoro-2-(p-tolylmethoxy)pyrimidin-4-amine (F3.2.6), 5-fluoro-2-(4-fluorophenylmethoxy) pyrimidin-4-amine (F3.2.7);

F4) Inhibitors of cell division and cytoskeleton tubulin inhibitors, such as benzimidazoles, thiophanates: benomyl (F4.1.1), carbendazim (F4.1.2), fuberidazole (F4.1.3), thiabendazole (F4.1.4), thiophanate-methyl (F4.1.5); triazolopyrimidines: 5-chloro-7-(4-methylpiperidin-1-yl)-6-(2,4,6-trifluorophenyl)-[1,2,4]triazolo [1,5-a]pyrimidine (F4.1.6);

other cell division inhibitors: diethofencarb (F4.2.1), ethaboxam (F4.2.2), pencycuron (F4.2.3), fluopicolide (F4.2.4), zoxamide (F4.2.5), metrafenone (F4.2.6), pyriofenone (F4.2.7);

F5) Inhibitors of amino acid and protein synthesis methionine synthesis inhibitors (anilino-pyrimidines): cyprodinil (F5.1.1), mepanipyrim (F5.1.2), pyrimethanil (F5.1.3);

protein synthesis inhibitors: blasticidin-S (F5.2.1), kasugamycin (F5.2.2), kasugamycin hydrochloride-hydrate (F5.2.3), mildiomycin (F5.2.4), streptomycin (F5.2.5), oxytetracyclin (F5.2.6), polyoxine (F5.2.7), validamycin A (F5.2.8);

F6) Signal transduction inhibitors

MAP/histidine kinase inhibitors: fluoroimid (F6.1.1), iprodione (F6.1.2), procymidone (F6.1.3), vinclozolin (F6.1.4), fenpiclonil (F6.1.5), fludioxonil (F6.1.6);

G protein inhibitors: quinoxyfen (F.2.1);

F7) Lipid and membrane synthesis inhibitors

Phospholipid biosynthesis inhibitors: edifenphos (F7.1.1), iprobenfos (F7.1.2), pyrazophos (F7.1.3), isoprothiolane (F7.1.4);

lipid peroxidation: dicloran (F7.2.1), quintozene (F7.2.2), tecnazene (F7.2.3), tolclofos-methyl (F7.2.4), biphenyl (F7.2.5), chloroneb (F7.2.6), etridiazole (F7.2.7);

phospholipid biosynthesis and cell wall deposition: dimethomorph (F7.3.1), flumorph (F7.3.2), mandipropamid (F7.3.3), pyrimorph (F7.3.4), benthiavalicarb (F7.3.5), iprovalicarb (F7.3.6), valifenalate (F7.3.7) and N-(1-(1-(4-cyano-phenypethanesulfonyl)-but-2-yl) carbamic acid-(4-fluorophenyl) ester (F7.3.8);

compounds affecting cell membrane permeability and fatty acides: propamocarb (F7.4.1);

fatty acid amide hydrolase inhibitors: oxathiapiprolin (F7.5.1), 2-{3-[2-(1-{[3,5-bis(difluoromethyl-1H-pyrazol-1-yl]acetyl}piperidin-4-yl)-1,3-thiazol-4-yl]-4,5-dihydro-1,2-oxazol-5-yl}phenyl methanesulfonate (F7.5.2), 2-{3-[2-(1-{[3,5-bis(difluoromethyl)-1H-pyrazol-1-yl]acetyl}piperidin-4-yl) 1,3-thiazol-4-yl]-4, 5-dihydro-1,2-oxazol-5-yl}-3-chlorophenyl methanesulfonate (F7.5.3);

F8) Inhibitors with Multi Site Action inorganic active substances: Bordeaux mixture (F8.1.1), copper acetate (F8.1.2), copper hydroxide (F8.1.3), copper oxychloride (F8.1.4), basic copper sulfate (F8.1.5), sulfur (F8.1.6);

thio- and dithiocarbamates: ferbam (F8.2.1), mancozeb (F8.2.2), maneb (F8.2.3), metam (F8.2.4), metiram (F8.2.5), propineb (F8.2.6), thiram (F8.2.7), zineb (F8.2.8), ziram (F8.2.9);

organochlorine compounds (e.g. phthalimides, sulfamides, chloronitriles): anilazine (F8.3.1), chlorothalonil (F8.3.2), captafol (F8.3.3), captan (F8.3.4), folpet (F8.3.5), dichlofluanid (F8.3.6), dichlorophen (F8.3.7), hexachlorobenzene (F8.3.8), pentachlorphenole (F8.3.9) and its salts, phthalide (F8.3.10), tolylfluanid (F8.3.11), N-(4-chloro-2-nitro-phenyl)-N-ethyl-4-methyl-benzenesulfonamide (F8.3.12);

guanidines and others: guanidine (F8.4.1), dodine (F8.4.2), dodine free base (F8.4.3), guazatine (F8.4.4), guazatine-acetate (F8.4.5), iminoctadine (F8.4.6), iminoctadine-triacetate (F8.4.7), iminoctadine-tris(albesilate) (F8.4.8), dithianon (F8.4.9), 2,6-dimethyl-1H,5H-[1,4]dithiino[2,3-c:5,6-c']dipyrrole-1,3,5,7(2H,6H)-tetraone (F8.4.10);

F9) Cell wall synthesis inhibitors inhibitors of glucan synthesis: validamycin (F9.1.1), polyoxin B (F9.1.2);

melanin synthesis inhibitors: pyroquilon (F9.2.1), tricyclazole (F9.2.2), carpropamid (F9.2.3), dicyclomet (F9.2.4), fenoxanil (F9.2.5);

F10) Plant defence inducers acibenzolar-S-methyl (F10.1.1), probenazole (F10.1.2), isotianil (F10.1.3), tiadinil (F10.1.4), prohexadione-calcium (F10.1.5); phosphonates: fosetyl (F10.1.6), fosetyl-aluminum (F10.1.7), phosphorous acid and its salts (F10.1.8), potassium or sodium bicarbonate (F10.1.9);

F11) Unknown mode of action bronopol (F11.1.1), chinomethionat (F11.1.2), cyflufenamid (F11.1.3), cymoxanil (F11.1.4), dazomet (F11.1.5), debacarb (F11.1.6), diclomezine (F11.1.7), difenzoquat (F11.1.8), difenzoquat-methylsulfate (F11.1.9), diphenylamin (F11.1.10), fenpyrazamine (F11.1.11), flumetover (F11.1.12), flusulfamide (F11.1.13), flutianil (F11.1.14), methasulfocarb (F11.1.15), nitrapyrin (F11.1.16), nitrothal-isopropyl (F11.1.18), oxathiapiprolin (F11.1.19), tolprocarb (F11.1.20), oxin-copper (F11.1.21), proquinazid (F11.1.22), tebufloquin (F11.1.23), tecloftalam (F11.1.24), triazoxide (F11.1.25), 2-butoxy-6-iodo-3-propylchromen-4-one (F11.1.26), 2-[3,5-bis(difluoromethyl)-1H-pyrazol-1-yl]-1-[4-(4-{5-[2-(prop-2-yn-1-yloxy)phenyl]-4,5-dihydro-1,2-oxazol-3-yl}-1,3-thiazol-2-yl)piperidin-1-yl]ethanone (F11.1.27), 2-[3,5-bis(difluoromethyl)-1H-pyrazol-1-yl]-1-[4-(4-{5-[2-fluoro-6-(prop-2-yn-1-yloxy)phenyl]-4,5-dihydro-1,2-oxazol-3-yl}-1,3-thiazol-2-Apiperidin-1-yl]ethanone (F11.1.28), 2-[3,5-bis(difluoromethyl)-1H-pyrazol-1-yl]-1-[4-(4-{5-[2-chloro-6-(prop-2-yn-1-yloxy)phenyl]-4,5-dihydro-1,2-oxazol-3-yl}-1,3-thiazol-2-Apiperidin-1-yl]ethanone (F11.1.29), N-(cyclopropylmethoxyimino-(6-difluoromethoxy-2,3-difluoro-phenyl)-methyl)-2-phenyl acetamide (F11.1.30), N'-(4-(4-chloro-3-trifluoromethyl-phenoxy)-2,5-dimethyl-phenyl)-N-ethyl-N-methyl formamidine (F11.1.31), N'-(4-(4-fluoro-3-trifluoromethyl-phenoxy)-2,5-dimethyl-phenyl)-N-ethyl-N-methyl formamidine (F11.1.32), N'-(2-methyl-5-trifluoromethyl-4-(3-trimethylsilanyl-propoxy)-phenyl)-N-ethyl-N-methyl formamidine (F11.1.33), N'-(5-difluoromethyl-2-methyl-4-(3-trimethylsilanyl-propoxy)-phenyl)-N-ethyl-N-methyl formamidine (F11.1.34), methoxy-acetic acid 6-tert-butyl-8-fluoro-2,3-dimethyl-quinolin-4-yl ester (F11.1.35), 3-[5-(4-methylphenyl)-2,3-dimethyl-isoxazolidin-3-yl]-pyridine (F11.1.36), 3-[5-(4-chloro-phenyl)-2,3-dimethyl-isoxazolidin-3-yl]-pyridine (pyrisoxazole) (F11.1.37), N-(6-methoxy-pyridin-3-yl) cyclopropanecarboxylic acid amide (F11.1.38), 5-chloro-1-(4,6-dimethoxy-pyrimidin-2-yl)-2-methyl-1H-benzoimidazole (F11.1.39), 2-(4-chloro-phenyl)-N-[4-(3,4-dimethoxy-phenyl)-isoxazol-5-yl]-2-prop-2-ynyloxy-acetamide, ethyl (Z)-3-amino-2-cyano-3-phenyl-prop-2-enoate (F11.1.40), picarbutrazox (F11.1.41), pentyl N-[6-[[(Z)-[(1-methyltetrazol-5-yl)-phenyl-methylene]amino]oxymethyl]-2-pyridyl]carbamate (F11.1.42), 2-[2-[(7,8-difluoro-2-methyl-3-quinolypoxy]-6-fluorophenyl]propan-2-ol (F11.1.43), 2-[2-fluoro-6-[(8-fluoro-2-methyl-3-quinolyl)oxy]phenyl]propan-2-ol (F11.1.44), 3-(5-fluoro-3,3,4,4-tetramethyl-3,4-dihydroisoquinolin-1-yl)quinoline (F11.1.45), 3-(4,4-difluoro-3,3-dimethyl-3,4-dihydroisoquinolin-1-yl)quinoline (F11.1.46), 3-(4,4,5-trifluoro-3,3-dimethyl-3,4-dihydroisoquinolin-1-yl)quinoline (F11.1.47), 9-fluoro-2,2-dimethyl-5-(3-quinolyl)-3H-1,4-benzoxazepine (F11.1.48), wherein component A and component C are present in a weight ratio from 10000:1 to 1:10000, preferably from 7000:1 to 1:7000, also preferably from 5000:1 to 1:5000, also preferably from 1000:1 to 1:1000, more preferably from 100:1 to 1:100, also more preferably from 70:1 to 1:70, particularly preferably from 25:1 to 1:25, also particularly preferably from 10:1 to 1:10; and component B and C are present in a weight ratio from 10000:1 to 1:10000, preferably from 7000:1 to 1:7000, also preferably from 5000:1 to 1:5000, also preferably from 1000:1 to 1:1000, more preferably from 100:1 to 1:100, also more preferably from 70:1 to 1:70, particularly preferably from 25:1 to 1:25, also particularly preferably from 10:1 to 1:10.

Ternary mixtures of a mixture from A-1 to A-66 and a fungicide C from the groups F.1 to F.11 are another preferred embodiments of the invention.

The ternary mixtures of the present invention have excellent activity against a broad spectrum of phytopathogenic fungi and animal pests.

The mixtures of the present invention have excellent activity against a broad spectrum of animal pests.

They are in particular suitable for efficiently controlling invertebrate pests. Particularier, they are suitable for efficiently controlling arthropodal pests such as arachnids, myriapedes and insects as well as nematodes.

In particular, they are suitable for controlling insect pests, such as insects from the order of lepidopterans (*Lepidoptera*), for example *Agrotis ypsilon, Agrotis segetum, Alabama argillacea, Anticarsia gemmatalis, Argyresthia conjugella, Autographa gamma, Bupalus piniarius, Cacoecia murinana, Capua reticulana, Cheimatobia brumata, Choristoneura fumiferana, Choristoneura occidentalis, Cirphis unipuncta, Cydia pomonella, Dendrolimus pini, Diaphania nitidalis, Diatraea grandiosella, Earias insulana, Elasmopalpus lignosellus, Eupoecilia ambiguella, Evetria bouliana, Feltia subterranea, Galleria mellonella, Grapholitha funebrana, Grapholitha molesta, Heliothis armigera, Heliothis virescens, Heliothis zea, Hellula undalis, Hibernia defoliaria, Hyphantria cunea, Hyponomeuta malinellus, Keiferia lycopersicella, Lambdina fiscellaria, Laphygma exigua, Leucoptera coffeella, Leucoptera scitella, Lithocolletis blancardella, Lobesia botrana, Loxostege sticticalis, Lymantria dispar, Lymantria monacha, Lyonetia clerkella, Malacosoma neustria, Mamestra brassicae, Orgyia pseudotsugata, Ostrinia nubilalis, Panolis flammea, Pectinophora gossypiella, Peridroma saucia, Phalera bucephala, Phthorimaea operculella, Phyllocnistis citrella, Pieris brassicae, Plathypena scabra, Plutella xylostella, Pseudoplusia includens, Rhyacionia frustrana, Scrobipalpula absoluta, Sitotroga cerealella, Sparganothis pilleriana, Spodoptera frugiperda, Spodoptera littoralis, Spodoptera litura, Thaumatopoea pityocampa, Tortrix viridana, Trichoplusia ni* and *Zeiraphera canadensis;* beetles (*Coleoptera*), for example *Agrilus sinuatus, Agriotes lineatus, Agriotes obscurus, Amphimallus solstitialis, Anisandrus dispar, Anthonomus grandis, Anthonomus pomorum, Aphthona euphoridae, Athous haemorrhoidalis, Atomaria linearis, Blastophagus piniperda, Blitophaga undata, Bruchus rufimanus, Bruchus pisorum, Bruchus lentis, Byctiscus betulae, Cassida nebulosa, Cerotoma trifurcata, Cetonia aurata, Ceuthorrhynchus assimilis, Ceuthorrhynchus napi, Chaetocnema tibialis, Conoderus vespertinus, Crioceris asparagi, Ctenicera ssp., Diabrotica longicornis, Diabrotica semipunctata, Diabrotica 12-punctata Diabrotica speciosa, Diabrotica virgifera, Epilachna varivestis, Epitrix hirtipennis, Eutinobothrus brasiliensis, Hylobius abietis, Hypera brunneipennis, Hypera postica, Ips typographus, Lema bilineata, Lema melanopus, Leptinotarsa decemlineata, Limonius californicus, Lissorhoptrus oryzophilus, Melanotus communis, Meligethes aeneus, Melolontha hippocastani, Melolontha melolontha, Oulema oryzae, Otiorrhynchus sulcatus, Otiorrhynchus ovatus, Phaedon cochleariae, Phyllobius pyri, Phyllotreta chrysocephala, Phyllophaga sp., Phyllopertha horticola, Phyllotreta nemorum, Phyllotreta striolata, Popillia japonica, Sitona lineatus* and *Sitophilus granaria;* flies, mosquitoes (*Diptera*), e.g. *Aedes aegypti, Aedes albopictus, Aedes vexans, Anastrepha ludens, Anopheles*

*maculipennis, Anopheles crucians, Anopheles albimanus, Anopheles gambiae, Anopheles freeborni, Anopheles leucosphyrus, Anopheles minimus, Anopheles quadrimaculatus, Calliphora vicina, Ceratifis capitata, Chrysomya bezziana, Chrysomya hominivorax, Chrysomya macellaria, Chrysops discalis, Chrysops silacea, Chrysops atlanticus, Cochliomyia hominivorax, Contarinia sorghicola Cordylobia anthropophaga, Culicoides furens, Culex pipiens, Culex nigripalpus, Culex quinquefasciatus, Culex tarsalis, Culiseta inomata, Culiseta melanura, Dacus cucurbitae, Dacus oleae, Dasineura brassicae, Delia antique, Delia coarctata, Delia platura, Delia radicum, Dermatobia hominis, Fannia canicularis, Geomyza Tripunctata, Gasterophilus intestinalis, Glossina morsitans, Glossina palpalis, Glossina fuscipes, Glossina tachinoides, Haematobia irritans, Haplodiplosis equestris, Hippelates ssp., Hylemyia platura, Hypoderma lineata, Leptoconops torrens, Liriomyza safivae, Liriomyza trifolii, Lucilia caprin, Lucilia cuprina, Lucilia sericata, Lycoria pectoralis, Mansonia titfilanus, Mayetiola destructor, Musca autumnalis, Musca domestica, Muscina stabulans, Oestrus ovis, Opomyza florum, Oscinella frit, Pegomya hysocyami, Phorbia antiqua, Phorbia brassicae, Phorbia coarctata, Phlebotomus argentipes, Psorophora columbiae, Psila rosae, Psorophora discolor, Prosimulium mixtum, Rhagoletis cerasi, Rhagoletis pomonella, Sarcophaga haemorrhoidalis, Sarcophaga ssp., Simulium vittaturn, Stomoxys calcitrans, Tabanus bovinus, Tabanus atratus, Tabanus lineola,* and *Tabanus similis, Tipula oleracea,* and *Tipula paludosa;* thrips (*Thysanoptera*), e.g. *Dichromothrips corbetti, Dichromothrips ssp., Frankliniella fusca, Frankliniella occidentalis, Frankliniella tritici, Scirtothrips citri, Thrips oryzae, Thrips palmi* and *Thrips tabaci,* termites (*Isoptera*), e.g. *Calotermes flavicollis, Leucotermes flavipes, Heterotermes aureus, Reticulitermes flavipes, Reticulitermes virginicus, Reticulitermes lucifugus, Reticulitermes santonensis, Reticulitermes grassei, Termes natalensis,* and *Coptotermes formosanus;* cockroaches (*Blattaria-Blattodea*), e.g. *Blattella germanica, Blattella asahinae, Periplaneta americana, Periplaneta japonica, Periplaneta brunnea, Periplaneta fuligginosa, Periplaneta australasiae,* and *Blatta orientalis,* bugs, aphids, leafhoppers, whiteflies, scale insects, cicadas (*Hemiptera*), e.g. *Acrosternum hilare, Blissus leucopterus, Cyrtopeltis notatus, Dysdercus cingulatus, Dysdercus intermedius, Eurygaster integriceps, Euschistus impictiventris, Leptoglossus phyllopus, Lygus lineolaris, Lygus pratensis, Nezara viridula, Piesma quadrata, Solubea insularis, Thyanta perditor, Acyrthosiphon onobrychis, Adelges laricis, Aphidula nasturtii Aphis fabae, Aphis forbesi, Aphis pomi, Aphis gossypii, Aphis grossulariae, Aphis schneiden, Aphis spiraecola, Aphis sambuci, Acyrthosiphon pisum, Aulacorthum solani, Bemisia argentifolu, Brachycaudus careful, Brachycaudus helichrysi, Brachycaudus persicae, Brachycaudus prunicola, Brevicoryne brassicae, Capitophorus horni, Cerosipha gossypii, Chaetosiphon fragaefolu, Cryptomyzus ribis, Dreyfusia nordmannianae, Dreyfusia piceae, Dysaphis radicola, Dysaulacorthum pseudosolani, Dysaphis plantaginea, Dysaphis gyri, Empoasca fabae, Hyalopterus pruni, Hyperomyzus lactucae, Macrosibhum avenae, Macrosibhum euphorbiae, Macrosibhon rosae, Megoura viciae, Melanaphis pyrarius, Metopolophium dirhodum, Myzus persicae, Myzus ascalonicus, Myzus cerasi, Myzus varians, Nasono via ribis-nigri, Nilaparvata lugens, Pemphigus bursarius, Perkinsiella saccharicida, Phorodon humuli, Psylla mali, Psylla piri; Rhopalomyzus ascalonicus, Rhopalosibhum maidis, Rhopalosibhum padi, Rhopalosibhum insertum, Sappaphis mala, Sappaphis mali, Schizaphis graminum, Schizoneura lanuginosa, Sitobion a venae, Trialeurodes vaporariorum, Toxoptera aurantiiand, Viteus vitifolu, Cimex lectularius, Cimex hemibterus, Reduvius senilis, Triatoma ssp.,* and *Arilus critatus;* ants, bees, wasps, sawflies (*Hymenoptera*), e.g. *Athalia rosae, Atta cephalotes, Atta capiguara, Atta cephalotes, Atta laevigata, Atta robusta, Atta sexdens, Atta texana, Crematogaster ssp., Hoplocampa minuta, Hoplocampa testudinea, Lasius niger, Monomorium pharaonis, Solenopsis geminata, Solenopsis invicta, Solenopsis richteri, Solenopsis xyloni, Pogonomyrmex barbatus, Pogonomyrmex californicus, Pheidole megacephala, Dasymutilla occidentalis, Bombus ssp., Vespula squamosa, Para vespula vulgaris, Para vespula pennsylvanica, Para vespula germanica, Dolichovespula maculata, Vespa crabro, Polistes rubiginosa, Camponotus floridanus,* and *Linepithema humlle;* crickets, grasshoppers, locusts (*Orthoptera*), e.g. *Acheta domestica, Gryllotalpa gryllotalpa, Locusta migratoria, Melanoplus bivittatus, Melanoplus femurrubrum, Melanoplus mexicanus, Melanoplus sanguinipes, Melanoplus spretus, Nomadacris septemfasciata, Schistocerca americana, Schistocerca gregaria, Dociostaurus maroccanus, Tachycines asynamorus, Oedaleus senegalensis, Zonozerus variegatus, Hieroglyphus daganensis, Kraussaria angulifera, Calliptamus italicus, Chortoicetes terminifera,* and *Locustana pardalina;* arachnoidea, such as arachnids (*Acarina*), e.g. of the families Argasidae, Ixodidae and Sarcoptidae, such as *Amblyomma americanum, Amblyomma variegatum, Ambryomma maculatum, Argas persicus, Boophilus annulatus, Boophilus decoloratus, Boophilus microplus, Dermacentor siivarum, Dermacentor andersoni, Dermacentor variabiks, Hyalomma truncatum, Ixodes ricinus, Ixodes rubicundus, Ixodes scapularis, Ixodes holocyclus, Ixodes pacificus, Ornithodorus moubata, Ornithodorus hermsi, Ornithodorus turicata, Ornithonyssus bacoti, Otobius megnini, Dermanyssus gallinae, Psoroptes ovis, Rhipicephalus sanguineus, Rhipicephalus appendiculatus, Rhipicephalus evertsi, Sarcoptes scabiei,* and *Eriophyidae ssp.* such as *Aculus schlechtendali, Phyllocoptrata oleivora* and *Eriophyes sheldoni; Tarsonemidae ssp.* such as *Phytonemus pallidus* and *Polyphagotarsonemus latus; Tenuipalpidae ssp.* such as *Brevibalpus phoenicis; Tetranychidae ssp.* such as *Tetranychus cinnabarinus, Tetranychus kanzawai, Tetranychus pacificus, Tetranychus telarius* and *Tetranychus urticae, Panonychus ulmi, Panonychus citri,* and *Oligonychus pratensis; Araneida,* e.g. *Latrodectus mactans,* and *Loxosceles reclusa;* fleas (*Siphonaptera*), e.g. *Ctenocephalides fells, Ctenocephalides canis, Xenopsylla cheopis, Pulex irritans, Tunga penetrans,* and *Nosopsyllus fasciatus,* silverfish, firebrat (*Thysanura*), e.g. *Lepisma saccharina* and *Thermobia domestica,* centipedes (*Chilopoda*), e.g. *Scutigera coleoptrata,* millipedes (*Diplopoda*), e.g. *Narceus ssp.,* earwigs (*Dermaptera*), e.g. forficula auricularia, lice (*Phthiraptera*), e.g. *Pediculus humanus capitis, Pediculus humanus corporis, Pthirus pubis, Haematopinus eurysternus, Haematopinus suis, Linognathus vituli, Bovicola bovis, Menopon gallinae, Menacanthus stramineus* and *Solenopotes capillatus.*

Collembola (springtails), e.g. *Onychiurus ssp.,*

They are also suitable for controlling nematodes : plant parasitic nematodes such as root knot nematodes, *Meloidogyne hapla, Meloidogyne incognita, Meloidogyne javanica,* and other *Meloidogyne* species; cyst-forming nematodes, *Globodera rostochiensis* and other *Globodera* species; *Heterodera avenae, Heterodera glycines, Heterodera schachtu, Heterodera trifolg* and other *Heterodera* species; Seed gall nematodes, *Anguina* species; Stem and foliar nematodes, *Aphelenchoides* species; Sting nematodes, *Belonolaimus longicaudatus* and other *Belonolaimus* species; Pine nematodes, *Bursaphelenchus xylophilus* and other *Bursaphelenchus* species; Ring nematodes, *Criconema* species, *Criconemella* species, *Criconemoides* species, *Mesocriconema* species; Stem and bulb nematodes, *Ditylenchus destructor, Ditylenchus dipsaci* and other *Ditylenchus* species; Awl nematodes, *Dolichodorus* species; Spiral nematodes, *Heliocotylenchus multicinctus* and other *Helicotylenchus* species; Sheath and sheathoid nematodes, *Hemicycliophora* species and *Hemicriconemoides* species; *Hirshmanniella* species; Lance nematodes, *Hoploaimus* species; false rootknot nematodes, *Nacobbus* species; Needle nematodes, *Longidorus elongatus* and other *Longidorus* species; Lesion nematodes, *Pratylenchus neglectus, Pratylenchus penetrans, Pratylenchus curvitatus, Pratylenchus goodeyi* and other *Pratylenchus* species; Burrowing nematodes, *Radopholus similis* and other *Radopholus* species; Reniform nematodes, *Rotylenchus robustus* and other *Rotylenchus* species; *Scutellonema* species; Stubby root nematodes, *Trichodorus primitivus* and other *Trichodorus* species, *Paratrichodorus* species; Stunt nematodes, *Tylenchorhynchus claytoni, Tylenchorhynchus dubius* and other *Tylenchorhynchus species*; Citrus nematodes, *Tylenchulus* species; Dagger nematodes, *Xiphinema* species; and other plant parasitic nematode species.

They are also useful for controlling arachnids (*Arachnoidea*), such as acarians (*Acarina*), e.g. of the families Argasidae, Ixodidae and Sarcoptidae, such as *Amblyomma americanum, Amblyomma variegatum, Argas persicus, Boophilus annulatus, Boophilus decoloratus, Boophilus microplus, Dermacentor silvarum, Hyalomma truncatum, Ixodes ricinus, Ixodes rubicundus, Ornithodorus moubata, Otobius megnini, Dermanyssus gallinae, Psoroptes ovis, Rhipicephalus appendiculatus, Rhipicephalus evertsi, Sarcoptes scabiei, and Eriophyidae* ssp. such as *Aculus schlechtendali, Phyllocoptrata oleivora* and *Eriophyes sheldoni; Tarsonemidae* ssp. such as *Phytonemus pallidus* and *Polyphagotarsonemus latus; Tenuipalpidae* ssp. such as *Brevipalpus phoenicis; Tetranychidae* ssp. such as *Tetranychus cinnabarinus, Tetranychus kanzawai, Tetranychus pacificus, Tetranychus telarius* and *Tetranychus urticae, Panonychus ulmi, Panonychus citri,* and *oligonychus pratensis.*

The ternary mixtures comprising a fungicide C have excellent activity against a broad spectrum of phytopathogenic fungi *Ascomycetes, Basidiomycetes, Deuteromycetes* and *Peronosporomycetes* (syn. Oomycetes). Some of them are systemically effective and can be employed in crop protection as foliar fungicides, as fungicides for seed dressing and as soil fungicides. They can also be used for treating seed.

They are particularly important in the control of a multitude of fungi on various cultivated plants, such as wheat, rye, barley, oats, rice, corn, lawns, bananas, cotton, soybean, coffee, sugar cane, grapevines, fruits and ornamental plants, and vegetables such as cucumbers, beans, tomatoes, potatoes and cucurbits, and on the seeds of these plants. They are especially suitable for controlling the following plant diseases:

*Alternaria* species on vegetables, oilseed rape, sugar beet and fruit and rice, e.g. *A. solani* or *A. altemata* on potatoes and tomatoes;

*Aphanomyces* species on sugar beet and vegetables;
*Ascochyta* species on cereals and vegetables;
*Bipoianis* and *Drechslera* species on corn, cereals, rice and lawns, e.g. *D. maycks* on corn;
*Blumeria graminis* (powdery mildew) on cereals;
*Botrytis cinerea* (gray mold) on strawberries, vegetables, flowers and grapevines;
*Bremia iactucae* on lettuce;
*Cercospora* species on corn, soybeans, rice and sugar beet;
*Cochliobolus* species on corn, cereals, rice, e.g. *Cochliobolus sativus* on cereals, *Cochliobolus mlyabeanus* on rice;
*Colletotricum* species on soybeans and cotton;
*Drechslera* species, *Pyrenophora* species on corn, cereals, rice and lawns, e.g. *D. teres* on barley or *D. tritici-repentis* on wheat;
*Esca* on grapevines, caused by *Phaeoacremonium chlamydosporium, Ph. Aleophllum* and *Formitipora punctata* (syn. *Phellinus punctatus*);
*Exserohllum* species on corn;
*Erysiphe cichoracearum* and *Sphaerotheca fuliginea* on cucumbers;
*Fusarium* and *Verticillium* species on various plants, e.g. *F. graminearum* or *F. cuimorum* on cereals or *F. oxysporum* on a multitude of plants, such as, e.g., tomatoes;
*Gaeumanomyces graminis* on cereals;
*Gibberella* species on cereals and rice (e.g. *Gibberella fufikuroi* on rice);
*Grainstaining* complex on rice;
*Helminthosporium* species on corn and rice;
*Michrodochium nivale* on cereals;
*Mycosphaerella* species on cereals, bananas and peanuts, for example, *M. graminicola* on wheat or *M. fijiensis* on bananas;
*Peronospora* species on cabbage and bulbous plants, e.g. *P. brassicae* on cabbage or *P. destructor* on onions;
*Phakopsara pachyrhizi* and *Phakopsara meibomiae* on soybeans;
*Phomopsis* species on soybeans and sunflowers;
*Phytophthora infestans* on potatoes and tomatoes;
*Phytophthora* species on various plants, e.g. *P. capsici* on bell pepper;
*Plasmopara viticola* on grapevines;
*Podosphaera leucotricha* on apples;
*Pseudocercosporella herpotrichodes* on cereals;
*Pseudoperonospora* on various plants, e.g. *P. cubensis* on cucumber or *P. humili* on hops;
*Puccinia* species on various plants, e.g. *P. triticina, P. striformins, P. hordei* or *P. gramiris* on cereals or *P. asparagi* on asparagus;
*Pyricularia oryzae, Corticium sasakk Sarocladium oryzae, S. attenuatum, Entyloma oryzae* on rice;
*Pyricularia grisea* on lawns and cereals;
*Pythium* ssp. on lawns, rice, corn, cotton, oilseed rape, sunflowers, sugar beet, vegetables and other plants, e.g. *P. ultiumum* on various plants, *P. aphandermatum* on lawns;
*Rhizoctonia* species on cotton, rice, potatoes, lawns, corn, oilseed rape, sugar beet, vegetables and on various plants, e.g. *R. solani* on beet and various plants;
*Rhynchosporium secalis* on barley, rye and triticale;
*Sclerotinia* species on oilseed rape and sunflowers;
*Septoria tritici* and *Stagonospora nodorum* on wheat;
*Erysiphe* (syn. *Uncinula*) *necator* on grapevines;
*Setospaeria* species on corn and lawns;
*Sphacelotheca rellinia* on corn;

*Thievaliopsis* species on soybeans and cotton;
*Tilletia* species on cereals;
*Ustilago* species on cereals, corn and sugar cane, e.g. *U. maydis* on corn;
*Venturia* species (scab) on apples and pears, e.g. *V. inaequalis* on apples.

The mixtures according to the invention are also suitable for controlling *Lepidoptera, Coleoptera, Diptera, Thysanoptera* and *Hemiptera*.

In particular the mixtures are useful for the control of *Thysanoptera* and *Hemiptera*, especially *Hemiptera*.

In one preferred embodiment, the present invention relates to the use or method comprising the application of the pesticidal mixtures as defined above, wherein the pests are selected from the group consisting of green stink bug (*Acrosternum hilare*), brown marmorated stink bug (*Halyomorpha halys*), redbanded stink bug (*Piezodorus guildinu*), neotropical brown stink bug (*Euschistus heros*), brown stink bug (*Euschistus servus*), kudzu bug (*Megacopta cnbraria*), red-shouldered stink bug (*Thyanta custator*) and the dusky-brown stink bug (*Euschistus tristigmus*), the southern green stink bug (*Nezara vindula*), and combinations thereof.

In one embodiment the stinkbug target is *Nezara viridula, Piezodorus* ssp., *Acrosternum* ssp., Euschistus and in particular Euchistus heros are the preferred targets. More preferably the pesticidal mixtures are used to control Pentatomidae including green stink bug (*Acrosternum Mare*), brown marmorated stink bug (*Halyomorpha halys*), red-banded stink bug (*Piezodorus guildinu*), neotropical brown stink bug (*Euschistus heros*), brown stink bug (*Euschistus servus*), and kudzu bug (*Megacopta cnbraria*), red-shouldered stink bug (*Thyanta custator*), dusky-brown stink bug (*Euschistus tristigmus*), and southern green stink bug (*Nezara vindula*).

Moreover, the present invention also relates to and includes the following embodiments:
- a pesticidal mixtures as defined herein, preferably mixtures A-1 to A-66 for use in controlling rice pests, especially rice pest invertebrates, in rice;
- a compositions comprising pesticidal mixtures as defined herein, preferably mixtures A-1 to A-66 and at least one inert liquid and/or solid acceptable carrier, for use in controlling rice pests, especially rice pest invertebrates, in rice;
- a method for combating rice pest invertebrates, infestation, or infection by rice pest invertebrates, which method comprises contacting said pest or its food supply, habitat or breeding grounds with a pesticidally effective amount of at least one pesticidal mixture, as defined above and herein below, preferably mixtures A-1 to A-66 or a composition thereof;
- a method for controlling rice pest invertebrates, infestation, or infection by invertebrate pests, which method comprises contacting said pest or its food supply, habitat or breeding grounds with a pesticidally effective amount of at least one pesticidal mixture, as defined above and herein below, preferably mixtures A-1 to A-66, or a composition comprising at least one of at least one pesticidal mixture;
- a method for preventing or protecting against rice pest invertebrates comprising contacting the rice pest invertebrates, or their food supply, habitat or breeding grounds with at least one pesticidal mixtures as defined above, preferably mixtures A-1 to A-66, or a composition comprising at least one pesticidal mixture, as defined above and herein below;
- a method for protecting rice, rice plants, rice plant propagation material and/or growing rice plants from attack or infestation by rice pest invertebrates comprising contacting or treating the rice, rice plants, rice plant propagation material and growing rice plants, or soil, material, surface, space, area or water in which the rice, rice plants, rice plant propagation material is stored or the rice plant is growing, with a pesticidally effective amount of at least one pesticidal mixtures, as defined above and herein below, preferably mixtures A-1 to A-66, or a composition comprising of at least one pesticidal mixtures;
- a method for increasing the health of rice plants, especially in paddy rice fields, comprising the treatment with of at least one pesticidal mixtures, as defined herein, preferably mixtures A-1 to A-66;
- a method for increasing the yield of rice plants, comprising the treatment with of at least one pesticidal mixtures, as defined herein, preferably mixtures A-1 to A-66;
- rice seed comprising of a pesticidal mixture, as defined above and herein below, preferably mixtures A-1 to A-66, in an amount of from 0.1 g to 10 kg per 100 kg of seed;
- the use of the of pesticidal mixtures, as defined above and herein below, preferably mixtures A-1 to A-66, for protecting growing rice plants or rice plant propagation material from attack or infestation by rice pest invertebrates;

Rice pests:
In the context of this invention, rice pest invertebrates are animal pests, which occur in rice. The rice pest invertebrates include insects, acarids and nematodes, preferably insects. Rice pest invertebrates, which are well-known in rice, include but are not limited to the following species:

*Hemiptera:*
brown planthopper—*Nilaparvata lugens*
small brown planthopper—*Laodelphax striateiius*
white-backed planthopper—*Sogatella furcifera*
white leafhopper—*Cofana spectra*
green leafhopper—*Nephotettix virescens, N. nigriceps, N. cincticeps, N. maiayanus*
zig zag leafhopper—*Recllia dorsalis*
maize orange leafhopper—*Cicadulina bipunctata*
aster leafhopper—*Macrosteles fascifrons*
rice earhead bug, Leptocorisa oratorius, L. acuta
rice stink bugs—*Nezara viridula, Pygomenida varipennis, Eysarcoris, Tibraca limbatriventris, Eysarcoris ventraks*
small stink bug—*Oebalus poeciius, O. pugnax*
coreid bug—*Eysarcoris* sp
chinch bug—*Blissus leucopterus leucopterus*
rice mealybug, *Brevennia rehi, Pseudococcus saccharicola*
rice aphids, *Rhopalosiphum rufiabdominalis, Macrosiphum avenae, Hysteroneura setariae, Tetraneuro nigriabdominalis*
bean root aphid—*Smynthurodes betae*

*Lepidoptera:*
rice skipper—*Parnara guttata, Melanitis leda ismene*
rice stem borer/striped stem borer—*Chilo suppressaks, Chilo polychrusus, Chilo partellus, Chilo plejadellus*
rice stalk borer—*Chilotraea polychrysa*
pink rice borer—*Sesamia inferens*
yellow rice borer—*Tryporyza (=Scirpophaga) incertulas*
white rice borer—*Tryporyza innotata* rice leafroller/leaf folder—*Cnaphalocrocis medinaks, Marasmia patnalis, M. exigua*
rice ear-cutting caterpillar/armyworm—*Pseudaietia separata*
    green caterpillar—*Xanthodes transversa*
    green rice caterpillar—*Narnaga aenescens*
    green horned caterpillars—*Meianitis leda ismene, Mycaiesis* sp
    fall army worm—*Spodoptera frugiperda*
    cutworm—*Mythimna separata*
    rice case worm—*Nymphula depunctalis*
    black hairy caterpillar, *Amata* sp.
    hairy caterpillar—*Mocis frugalis*
    yellow caterpillar, *Psalis pennatula*
    rice semi-brown looper, *Mocis frugalis*
    rice semi-looper, *Chrysodeixis chalcites*
    grass webworm—*Herpetogramma licarsisaks*
    sugarcane borer—*Diatraea saccharaks*
    corn stalk borer—*Elasmopalpus lignosellus*
    striped grass looper—*Mocis latipes*
    european corn borer—*Ostrinia nubilalis*
    Mexican rice borer—*Eoreuma loftini*
*Coleoptera:*
    water weevil—*Lissorhopterus oryzophilus*
    rice plant weevil—*Echinocnemus squamous*
    rice weevil—*Oryzophagus oryzae*
    rice hispa—*Diclodispa armigera*
    rice leaf beetle—*Oulema oryzae*
    rice blackbug—*Scotinophora vermidulate, S. vermidulate, S. lurida, S. latiuscula*
    rice flea beetle—*Chaetocnima basalis*
    grubs—*Leucopholis irrorata, Leucopholis irrorata, Phyllophaga* sp, *Heteronychus* sp
    scarab beetle (bicho torito)—*Diloboderus abderus*
    billbugs—*Sphenophorus* ssp
    grape colaspis—*Colaspis brunnea, C. louisianae*
    rice pollen beetle, Chilolaba acuta
*Diptera:*
    stem maggot—*Chlorops oryzae*
    leafminer—*Agromyza oryzae*
    rice whorl maggot/rice stem maggot—*Hydrellia sasakii*
    rice whorl maggot/small rice leafminer—*Hydrellia griseola*
    rice gall midge—*Orseolia (=Pachydiplosis) oryzae*
    rice shoot fly—*Atherigona oryzae*
    rice seed midge—*Chironomus cavazzai, Chironomus* ssp, *Cricotopus* ssp
*Thysanoptera:*
    rice thrips—*Chloethrips oryzae, Stenochaetothrips biformis, Perrisothrips* sp., *Hoplothrips* sp.,
*Orthoptera:*
    rice grasshoppers, *Hieroglyphus banian, Hieroglyphus nigrorepletus, Catantops pinguis, Attractomorpha burri A. crenulate, A. psittacina psittacina, A. Bedeli, Oxya adenttata, Oxya ebneri; Oxya hyla intricata, Acrida turricata*
    locusts—*Locusta migratoria manilensis*
    mole cricket, *Gryiotalpa africana*
    field cricket: *Gryllus bimaculatus, Tereogryllus occipitalis, Euscyrtus concinus*
    katydid—*Conocephalus longipennis*
*Isoptera:*
    termites—*Macrotermes gilvus, Syntermes molestans*
*Hymenoptera:*
    ants—*Solenopsis geminata*
    rice white tip nematode—*Aphelenchoides besseyi*

*Acari:*
    rice panicle mite—*Steotarsonemus pinki*
*Crustacea:*
    tadpole shrimp—*Triops longicaudatus. T cancriformis*
    rice crayfish—*Procambarus clarklii, Orconectes virillis.*

In addition, rice is affected by a range of bugs including *Leptocorisa chinensis, Lagynotomus elongates, Nerzara viridula, Eysacoris parvus, Leptocorisa oratorius, Oebalus pugnax, Cletus trigonus*, as well as a variety of mites, caterpillars, beetles, rootworms and maggots.

In one embodiment, the rice pest invertebrate is a bitingichewing insect.

In one embodiment, the rice pest invertebrate is a piercingisucking insect.

In one embodiment, the rice pest invertebrate is a rasping insect.

In one embodiment, the rice pest invertebrate is a siphoning insect.

In one embodiment, the rice pest invertebrate is a sponging insect.

In one embodiment, the rice pest invertebrate is selected from brown planthopper (*Nilaparvata lugens*), small brown planthopper (*Laodelphax striatellus*), white-backed planthopper (*Sogatella furcifera*), rice stem boreristriped stem borer (*Chilo suppressalis*), yellow rice borer (*Tryporyza (=Scirpophaga) incertulas*), rice leafrollerileaf folder (*Cnaphalocrocis medinalis*), water weevil (*Lissorhopterus oryzophilus*).

In one embodiment, the rice pest invertebreate is from the order *Hemiptera* or *Lepidoptera*.

In one embodiment, the rice pest invertebrate is from the order *Hemiptera*. In a further embodiment, the rice pest invertebrate is a hopper, preferably selected from brown planthopper (*Nilaparvata lugens*), small brown planthopper (*Laodeiphax striatellus*), white-backed planthopper (*Sogatella furcifera*), green leafhopper (*Nephotettix virescens*). In a further embodiment, the rice pest invertebrate is selected from brown planthopper (*Nilaparvata lugens*) and green leafhopper (*Nephotettix virescens*), preferably brown planthopper (*Nilaparvata lugens*).

In one embodiment, the rice pest invertebrate is the brown planthopper (*Nilaparvata lugens*).

In one embodiment, the rice pest invertebrate is the green leafhopper (*Nephotettix virescens*).

In a further embodiment, the rice pest invertebrate is a stink bug, preferably selected from rice stink bugs (*Nezara viridula, Pygomenida varipenrks, Eysarcoris, Tibraca limbatriventris, Eysarcoris ventralis*) or small stink bug (*Oebalus poeciius, O. pugnax*).

In one embodiment, the rice pest invertebrate is from the order *Lepidoptera*. In a further embodiment, the rice pest invertebrate is a borer, preferably stem borer, preferably rice stem borer (*Chilo suppressalis*) or yellow rice borer (*Tryporyza (=Scirpophaga) incertulas*).

In a further embodiment, the rice pest invertebrate is the rice leafrollerileaf folder (*Cnaphalocrocis medinaks, Marasmia patnaks, M. exigua*).

In one embodiment, the rice pest invertebrate is from the order Coleoptera. In a further embodiment, the rice pest invertebrate is water weevil (*Lissorhopterus oryzophilus*). In a further embodiment, the rice pest invertebrate is rice weevil (*Oryzophagus oryzae*).

In one embodiment, the rice pest invertebrate is from the family of termites (order (*Isoptera*).

The pesticidal mixtures A-1 to A-66, particularly mixture A-1 to A-33, are preferably used to control lepidopterans (*Lepidoptera*), such as *Spodoptera frugiperda, Spodoptera*

*littoralis, Spodoptera litura*; beetles (*Coleoptera*), such as *Anthonomus grandis, Anthonomus pomorum*, and thrips (*Thysanoptera*), such as *Scirtothrips citri*.

The invention particularly relates to methods, wherein the pesticidal mixtures of the invention are suitable for use in protecting rice, rice plants, rice plant propagation materials, such as seeds, or soil or water, in which the rice plants are growing, from attack or infestation by rice pests, especially rice pest invertebrates. Therefore, the present invention also relates to a plant protection methods, which comprises contacting rice, rice plants, rice plant propagation materials, such as seeds, or soil or water, in which the plants are growing, to be protected from attack or infestation by rice pests, especially rice pest invertebrates, with a pesticidally effective amount of a mixture of the present invention.

The present invention also relates to a method of combating or controlling rice pests, especially rice pest invertebrates, which comprises contacting the rice pests, especially rice pest invertebrates, their habitat, breeding ground, or food supply, or the rice, rice plants, rice plant propagation materials, such as seeds, or soil or water, or the area, material or environment in which the rice pests, especially rice pest invertebrates, are growing or may grow, with a pesticidally effective amount of a mixture of the present invention.

The mixtures of the present invention are effective through both contact and ingestion. Furthermore, the mixtures of the present invention can be applied to any and all developmental stages, such as egg, larva, pupa, and adult.

The mixtures of the present invention can be applied as such or in form of compositions comprising them as defined above. Furthermore, the mixtures of the present invention can be applied together with a mixing partner as defined above or in form of compositions comprising said mixtures as defined above. The components of said mixture can be applied simultaneously, jointly or separately, or in succession, that is immediately one after another and thereby creating the mixture "in situ" on the desired location, e.g. the plant, the sequence, in the case of separate application, generally not having any effect on the result of the control measures.

The application can be carried out both before and after the infestation of the rice, rice plants, rice plant propagation materials, such as seeds, soil, or the area, material or environment by the pests.

Suitable application methods include inter alia soil treatment, seed treatment, in furrow application, water inlet application and foliar application. Soil treatment methods include drenching the soil, dipping roots, or soil injection. Seed treatment techniques include seed dressing, seed coating, seed dusting, seed soaking, and seed pelleting. In furrow applications typically include the steps of making a furrow in cultivated land, seeding the furrow with seeds, applying the pesticidally active mixture to the furrow, and closing the furrow. Foliar application refers to the application of the pesticidally active mixture to plant foliage, e.g. through spray equipment. For foliar applications, it can be advantageous to modify the behavior of the pests by use of pheromones in combination with the mixtures of the present invention. Suitable pheromones for specific crops and pests are known to a skilled person and publicly available from databases of pheromones and semiochemicals, such as http://www.pherobase.com.

In the context of rice cultivation and rice crops, the following application types are of special relevance:

"Granular application" involves manual or mechanical scattering or throwing of insecticide granules or mixtures of insecticidesifungicides and nematicides, directly into a field or nursery box, either on the surface of the soil or on standing water. The granular formulation may be mixed with a filler, carrier or fertilizer to allow for uniform distribution in the field.

"Floating packet application" refers to the application of an insecticide or mixtures of insecticidesifungicides and nematicides in a water soluble sachetipacket by throwing into the paddy field in standing water.

"Seedling box applications" refers to manual or mechanical incorporation of insecticide formulations (for eg. Granules, liquid) in nursery boxes or seedling boxes containing rice seedlings before being transplanted into the main field.

"Seed treatment" involves the soakingimixing of rice seeds in a solution of an insecticide or insecticide/nematicide/fungicide mixture. This application is carried out before sowing, either before or after seed germination.

"Foliar application" refers to application of an insecticide or an insecticide/fungicide/nematicide/selective herbicides in water or oil as a spray application using various application equipment (eg. knapsack, power sprayer, boom sprayer, etc).

"Soil application" refers to the application of an insecticide or a mixture of an insecticideifungicideinematicideiselective herbicide into the soil either as drench application, water inlet application or as a granular application.

"Aerial application" refers to the application of a granular or liquid application of an insecticide or a mixture of an insecticideifungicideinematicideiselective herbicide to the field using aeroplanes, helicopters or drones. "Dust application" involves the directed application of an insecticide or a mixture of an insecticideifungicideinematicideiselective herbicide as a dust formulation using specialized applicators (eg. Power dusters) directly into the field.

"Water inlet application" is the application of a liquid formulation of an insecticide or or a mixture of an insecticideifungicideinematicideiselective herbicide at the point where irrigation water is released into the paddy field.

"Encircling application" is a type of application where a liquid or granular formulation of an insecticide or a mixture of an insecticideifungicideinematicideiselective herbicide is applied to standing water, in a clockwork or anti clockwork direction, to the inside borders of a paddy field.

Preferred applications are granular application, seedling box application and foliar application.

In one embodiment, the invention relates to methods, in which the pesticide is applied by granular application.

In one embodiment, the invention relates to methods, in which the pesticide is applied by seedling box application.

In one embodiment, the invention relates to methods, in which the pesticide is applied by foliar application.

The mixtures according to the present invention can be converted into the customary formulations, for example solutions, emulsions, suspensions, dusts, powders, pastes and granules. The use form depends on the particular intended purpose; in each case, it should ensure a fine and even distribution of the compounds according to the invention.

The mixtures of the present invention can be converted into customary types of agro-chemical compositions, e.g. solutions, emulsions, suspensions, dusts, powders, pastes, granules, pressings, capsules, and mixtures thereof. Examples for composition types are suspensions (e.g. SC, OD, FS), emulsifiable concentrates (e.g. EC), emulsions (e.g. EW, EO, ES, ME), capsules (e.g. CS, ZC), pastes, pastilles, wettable powders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations for the treatment of plant propagation materials such as seeds (e.g. GF). These and further compositions types are defined in the "Catalogue of pesticide formulation types and international coding system", Technical Mono-graph No. 2, 6th Ed. May 2008, CropLife International.

The compositions are prepared in a known manner, such as described by Mollet and Grubemann, Formulation technology, Wiley V C H, Weinheim, 2001; or Knowles, New developments in crop protection product formulation, Agrow Reports DS243, T&F Informa, London, 2005.

Examples for suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e.g. toluene, paraffin, tetrahydronaphthalene, alkylated naphthalenes; alcohols, e.g. ethanol, propanol, butanol, benzylalcohol, cyclo-hexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharide powders, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emusifier, dispersant, solubilizer, wetter, penetration enhancer, protective colloid, or adjuvant. Examples of surfactants are listed in McCutcheon's, Vol.1: Emulsifiers & Detergents, McCutcheon's Directories, Glen Rock, USA, 2008 (International Ed. or North American Ed.)

Suitable anionic surfactants are alkali, alkaline earth or ammonium salts of sulfonates, sulfates, phosphates, carboxylates, and mixtures thereof. Examples of sulfonates are alkylaryl-sulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkyl naphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol eth-oxylates.

Suitable nonionic surfactants are alkoxylates, N-subsituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-subsititued fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are homo- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyeth-yleneamines.

Suitable adjuvants are compounds, which have a neglectable or even no pesticidal activity themselves, and which improve the biological performance of the mixtures of the present invention on the target. Examples are surfactants, mineral or vegetable oils, and other auxilaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

Examples for composition types and their preparation are:
i) Water-soluble concentrates (SL, LS)
10-60 wt % of a mixture of the invention and 5-15 wt % wetting agent (e.g. alcohol alkoxylates) are dissolved in water and/or in a water-soluble solvent (e.g. alcohols) up to 100 wt %. The active substance dissolves upon dilution with water.
ii) Dispersible concentrates (DC)
5-25 wt % of a mixture of the invention and 1-10 wt % dispersant (e.g. polyvi-nylpyrrolidone) are dissolved in up to 100 wt % organic solvent (e.g. cyclohexanone). Dilution with water gives a dispersion.

iii) Emulsifiable concentrates (EC)
15-70 wt % of a mixture of the invention and 5-10 wt % emulsifiers (e.g. calcium dodecylbenzenesulfonate and castor oil ethoxylate) are dissolved in up to 100 wt % water-insoluble organic solvent (e.g. aromatic hydrocarbon). Dilution with water gives an emulsion.

iv) Emulsions (EW, EO, ES)
5-40 wt % of a mixture of the invention and 1-10 wt % emulsifiers (e.g. calcium dodecylbenzene-sulfonate and castor oil ethoxylate) are dissolved in 20-40 wt % water-insoluble organic solvent (e.g. aromatic hydrocarbon). This mixture is introduced into up to 100 wt % water by means of an emulsifying machine and made into a homogeneous emulsion. Dilution with water gives an emulsion.

v) Suspensions (SC, OD, FS)
In an agitated ball mill, 20-60 wt % of a mixture of the invention are comminuted with addition of 2-10 wt % dispersants and wetting agents (e.g. sodium lignosulfonate and alcohol ethoxylate), 0.1-2 wt % thickener (e.g. xanthan gum) and up to 100 wt % water to give a fine active substance suspension. Dilution with water gives a stable suspension of the active substance. For FS type composition up to 40 wt % binder (e.g. polyvinylalcohol) is added.

vi) Water-dispersible granules and water-soluble granules (WG, SG)
50-80 wt % of a mixture of the invention are ground finely with addition of up to 100 wt % dispersants and wetting agents (e.g. sodium lignosulfonate and alcohol ethoxylate) and prepared as water-dispersible or water-soluble granules by means of technical appliances (e.g. extrusion, spray tower, fluidized bed). Dilution with water gives a stable dispersion or solution of the active substance.

vii) Water-dispersible powders and water-soluble powders (WP, SP, WS)
50-80 wt % of a mixture of the invention are ground in a rotor-stator mill with ad-dition of 1-5 wt % dispersants (e.g. sodium lignosulfonate), 1-3 wt % wetting agents (e.g. alcohol ethoxylate) and up to 100 wt % solid carrier, e.g. silica gel. Dilution with water gives a stable dis-persion or solution of the active substance.

viii) Gel (GW, GF)
In an agitated ball mill, 5-25 wt % of a mixture of the invention are comminuted with addition of 3-10 wt % dispersants (e.g. sodium lignosulfonate), 1-5 wt % thickener (e.g. carboxymethylcellulose) and up to 100 wt % water to give a fine suspension of the active substance. Dilution with water gives a stable suspension of the active substance.

ix) Microemulsion (ME)
5-20 wt % of a mixture of the invention are added to 5-30 wt % organic solvent blend (e.g. fatty acid dimethylamide and cyclohexanone), 10-25 wt % surfactant blend (e.g. alcohol ethoxylate and arylphenol ethoxylate), and water up to 100%. This mixture is stirred for 1 h to produce spontaneously a thermodynamically stable microemulsion.

x) Microcapsules (CS)
An oil phase comprising 5-50 wt % of a mixture of the invention, 0-40 wt % water insoluble organic solvent (e.g. aromatic hydrocarbon), 2-15 wt % acrylic monomers (e.g. methylmethacrylate, methacrylic acid and a di- or triacrylate) are dispersed into an aqueous solution of a protective colloid (e.g. polyvinyl alcohol). Radical polymerization initiated by a radical initiator results in the formation of poly(meth)acrylate microcapsules. Alternatively, an oil phase comprising 5-50 wt % of a mixture of the invention, 0-40 wt % water insoluble organic solvent (e.g. aromatic hydrocarbon), and an isocyanate monomer (e.g. diphenylmethene-4,4'-diisocyanatae) are dispersed into an aqueous solution of a protective colloid (e.g. polyvinyl alcohol). The addition of a polyamine (e.g. hexamethylenediamine) results in the for-mation of a polyurea microcapsule. The monomers amount to 1-10 wt %. The wt % relate to the total CS composition.

xi) Dustable powders (DP, DS)
1-10 wt % of a mixture of the invention are ground finely and mixed intimately with up to 100 wt % solid carrier, e.g. finely divided kaolin.

xii) Granules (GR, FG)
0.5-30 wt % of a mixture of the invention is ground finely and associated with up to 100 wt % solid carrier (e.g. silicate). Granulation is achieved by extrusion, spray-drying or the fluidized bed.

xiii) Ultra-low volume liquids (UL)
1-50 wt % of a mixture of the invention are dissolved in up to 100 wt % organic solvent, e.g. aromatic hydrocarbon.

The compositions types i) to xi) may optionally comprise further auxiliaries, such as 0.1-1 wt % bactericides, 5-15 wt % anti-freezing agents, 0.1-1 wt % anti-foaming agents, and 0.1-1 wt % colorants.

The agrochemical compositions generally comprise between 0.01 and 95%, preferably between 0.1 and 90%, and most preferably between 0.5 and 75%, by weight of active substance. The active substances are employed in a purity of from 90% to 100%, preferably from 95% to 100% (according to NMR spectrum).

Various types of oils, wetters, adjuvants, fertilizer, or micronutrients, and other pesticides (e.g. herbicides, insecticides, fungicides, growth regulators, safeners) may be added to the active substances or the compositions comprising them as premix or, if appropriate not until immediately prior to use (tank mix). These agents can be admixed with the compositions according to the invention in a weight ratio of 1:100 to 100:1, preferably 1:10 to 10:1.

The user applies the composition according to the invention usually from a predosage device, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

According to one embodiment, individual components of the composition according to the invention such as parts of a kit or parts of a binary or ternary mixture may be mixed by the user himself in a spray tank and further auxiliaries may be added, if appropriate.

In a further embodiment, either individual components of the composition according to the invention or partially premixed components, e.g. components comprising compounds according to the present invention and/or mixing partners as defined above, may be mixed by the user in a spray tank and further auxiliaries and additives may be added, if appropriate.

In a further embodiment, either individual components of the composition according to the invention or partially premixed components, e.g. components comprising compounds according to the present invention and/or mixing partners as defined above, can be applied jointly (e.g. after tank mix) or consecutively.

The mixtures of the present invention are employed as such or in form of compositions by treating the insects, the fungi or the plants, plant propagation materials, such as seeds, soil, surfaces, materials or rooms to be protected from insecticidal attack with a pesticidally effective amount of the active compounds. The application can be carried out both before and after the infection of the plants, plant propagation materials, such as seeds, soil, surfaces, materials or rooms by the insects.

The present invention also includes a method of combating animal pests and harmful fungi which comprises contacting the fungi and/or animal pests, their habit, breeding ground, food supply, cultivated plants, seed, soil, area, material or environment in which the animal pests are growing or may grow, or the materials, plants, seeds, soils, surfaces or spaces to be protected from animal attack or infestation with a pesticidally effective amount of a mixture according to the invention. The mixtures or compositions of these mixtures can also be employed for protecting plants from attack or infestation by invertebrate pests such as insects, acarids or nematodes comprising contacting a plant, or soil or water in which the plant is growing.

The compound A i.e. the compound of formula I or the compound of formula I with enantiomeric excess of compound I-R-1 or the compound I-R-1, and the one or more compound(s) B are usually applied in a weight ratio of from 10000:1 to 1:10000, preferably from 7000:1 to 1:7000, also preferably from 5000:1 to 1:5000, also preferably from 1000:1 to 1:1000, more preferably from 100:1 to 1:100, also more preferably from 70:1 to 1:70, particularly preferably from 25:1 to 1:25, also particularly preferably from 20:1 to 1:20, also particularly preferably from 10:1 to 1:10.

In ternary mixtures the compound A i.e. the compound of formula I or the compound of formula I with enantiomeric excess of compound I-R-1 or the compound I-R-1, selected from compounds I and compound B are usually present in ratio ranges of from 5000:1:1, to 5000:1000:1 to 5000: 1000:1 to 1:1000:1000 to 1:1000:1 to 1:1:1000, preferably from 500:1:1, to 500:100:1 to 500:100:1 to 1:100:100 to 1:100:1 to 1:1:100.

Depending on the desired effect, the application rates of the mixtures of the invention are from 5 g/ha to 2000 g/ha, preferably from 50 to 1500 g/ha, in particular from 50 to 750 g/ha.

The mixtures according to the invention are effective through both contact and ingestion.

According to a preferred embodiment of the invention, the mixtures according to the present invention are employed via soil application. According to a further preferred embodiment of the invention, the mixtures of the present invention are employed via soil application. Soil application is especially favorable for use against ants, termites, crickets, or cockroaches.

According to another preferred embodiment of the invention, for use against non crop pests such as ants, termites, wasps, flies, mosquitoes, crickets, locusts, or cockroaches the mixtures according to the present invention or the compounds according to the present invention are prepared into a bait preparation. The mixtures of the invention may also be applied against said non-crop pests.

The bait can be a liquid, a solid or a semisolid preparation (e.g. a gel).

Another aspect of the present invention is when preparing the mixtures, it is preferred to employ the pure active compounds I and B, to which further active compounds, e.g. against harmful fungi or having herbicidal activity, or growth-regulating agents or fertilizers can be added.

Compositions comprising the inventive mixture may further contain other active ingredients than those listed above. Compositions of this invention may further contain other active ingredients than those listed above. For example fungicides, herbicides, fertilizers such as ammonium nitrate, urea, potash, and superphosphate, phytotoxicants and plant growth regulators and safeners. These additional ingredients may be used sequentially or in combination with the above-described compositions, if appropriate also added only immediately prior to use (tank mix). For example, the plant(s) may be sprayed with a composition of this invention either before or after being treated with other active ingredients.

The mixtures according to the invention or compositions comprising the inventive compound I can be applied to any and all developmental stages, such as egg, larva, pupa, and adult. The pests may be controlled by contacting the target pest, its food supply, habitat, breeding ground or its locus with a pesticidally effective amount of the inventive mixtures or of compositions comprising the mixtures.

"Locus" means a plant, seed, soil, area, material or environment in which a pest is growing or may grow.

In general, "pesticidally effective amount" means the amount of the inventive mixtures or of compositions comprising the mixtures needed to achieve an observable effect on growth, including the effects of necrosis, death, retardation, prevention, and removal, destruction, or otherwise diminishing the occurrence and activity of the target organism. The pesticidally effective amount can vary for the various mixtures and/or compositions used in the invention. A pesticidally effective amount of the mixtures and/or compositions will also vary according to the prevailing conditions such as desired pesticidal effect and duration, weather, target species, locus, mode of application, and the like.

The mixtures or compositions of these mixtures can also be employed for protecting plants from attack or infestation by invertrebate pests such as insects, acarids or nematodes comprising contacting a plant, or soil or water in which the plant is growing.

The inventive mixtures are effective through both contact (via soil, glass, wall, bed net, carpet, plant parts or animal parts), and ingestion (bait, or plant part) and through trophallaxis and transfer.

Preferred application methods are into water bodies, via soil, cracks and crevices, pastures, manure piles, sewers, into water, on floor, wall, or by perimeter spray application and bait.

According to another preferred embodiment of the invention, for use against non crop pests such as ants, termites, wasps, flies, mosquitoes, crickets, locusts, or cockroaches the inventive mixtures are prepared into a bait preparation.

The bait can be a liquid, a solid or a semisolid preparation (e.g. a gel). The bait employed in the composition is a product which is sufficiently attractive to incite insects such as ants, termites, wasps, flies, mosquitoes, crickets etc. or cockroaches to eat it. This attractant may be chosen from feeding stimulants or para and/or sex pheromones readily known in the art.

Methods to control infectious diseases transmitted by insects (e.g. malaria, dengue and yellow fever, lymphatic filariasis, and leishmaniasis) with the inventive mixtures and their respective compositions also comprise treating surfaces of huts and houses, air spraying and impregnation of curtains, tents, clothing items, bed nets, tsetse-fly trap or the like. Insecticidal compositions for application to fibers, fabric, knitgoods, non-wovens, netting material or foils and tarpaulins preferably comprise a composition including the inventive mixtures, optionally a repellent and at least one binder.

The mixtures and the compositions comprising them can be used for protecting wooden materials such as trees, board fences, sleepers, etc. and buildings such as houses, outhouses, factories, but also construction materials, furniture, leathers, fibers, vinyl articles, electric wires and cables etc. from ants and/or termites, and for controlling ants and termites from doing harm to crops or human being (e.g. when the pests invade into houses and public facilities).

In the case of soil treatment or of application to the pests dwelling place or nest, the quantity of active ingredient(s) ranges from 0.0001 to 500 g per 100 m$^2$, preferably from 0.001 to 20 g per 100 m$^2$.

Customary application rates in the protection of materials are, for example, from 0.01 g to 1000 g of active compounds per m$^2$ treated material, desirably from 0.1 g to 50 g per m$^2$.

Insecticidal compositions for use in the impregnation of materials typically contain from 0.001 to 95 weight %, preferably from 0.1 to 45 weight %, and more preferably from 1 to 25 weight % of at least one repellent and/or insecticide.

For use in bait compositions, the typical content of active ingredient(s) is from 0.0001 weight % to 15 weight %, desirably from 0.001 weight % to 5% weight % of active compound. The composition used may also comprise other additives such as a solvent of the active material, a flavoring agent, a preserving agent, a dye or a bitter agent. Its attractiveness may also be enhanced by a special color, shape or texture.

For use in spray compositions, the content of the mixture of the active ingredients is from 0.001 to 80 weights %, preferably from 0.01 to 50 weight % and most preferably from 0.01 to 15 weight %.

For use in treating crop plants, the rate of application of the mixture of the active ingredients of this invention may be in the range of 0.1 g to 4000 g per hectare, desirably from 25 g to 600 g per hectare, more desirably from 50 g to 500 g per hectare.

In the context of the present invention, the term plant refers to an entire plant, a part of the plant or the plant propagation material.

The mixtures of the present invention and the compositions comprising them are particularly important in the control of a multitude of insects on various cultivated plants.

Plants which can be treated with the inventive mixtures include all genetically modified plants or transgenic plants, e.g. crops which tolerate the action of herbicides or fungicides or insecticides owing to breeding, including genetic engineering methods, or plants which have modified characteristics in comparison with existing plants, which can be generated for example by traditional breeding methods and/or the generation of mutants, or by recombinant procedures.

The term "plant propagation material" is to be understood to denote all the generative parts of the plant such as seeds and vegetative plant material such as cuttings and tubers (e.g. potatoes), which can be used for the multiplication of the plant. This includes seeds, roots, fruits, tubers, bulbs, rhizomes, shoots, sprouts and other parts of plants. Seedlings and young plants, which are to be transplanted after germination or after emergence from soil, may also be mentioned. These young plants may also be protected before transplantation by a total or partial treatment by immersion or pouring.

The term "cultivated plants" is to be understood as including plants which have been modified by breeding, mutagenesis or genetic engineering. Genetically modified plants are plants, which genetic material has been so modified by the use of recombinant DNA techniques that under natural circumstances cannot be obtained by cross breeding, mutations or natural recombinetion. Typically, one or more genes have been integrated into the genetic material of a genetically modified plant in order to improve certain properties of the plant.

The term "cultivated plants" is to be understood also including plants that have been rendered tolerant to applications of specific classes of herbicides, such as hydroxyphenylpyruvate dioxygenase (HPPD) inhibitors; acetolactate synthase (ALS) inhibitors, such as sulfonyl ureas (see e.g. U.S. Pat. No. 6,222,100, WO 01/82685, WO 00/26390, WO 97/41218, WO 98/02526, WO 98/02527, WO 04/106529, WO 05/20673, WO 03/14357, WO 03/13225, WO 03/14356, WO 04/16073) or imidazolinones (see e.g. U.S. Pat. No. 6,222,100, WO 01/82685, WO 00/26390, WO 97/41218, WO 98/02526, WO 98/02527, WO 04/106529, WO 05/20673, WO 03/14357, WO 03/13225, WO 03/14356, WO 04/16073); enolpyruvylshikimate-3-phosphate synthase (EPSPS) inhibitors, such as glyphosate (see e.g. WO 92/00377); glutamine synthetase (GS) inhibitors, such as glufosinate (see e.g. EP-A 242 236, EP-A 242 246) or oxynil herbicides (see e.g. U.S. Pat. No. 5,559,024) as a result of conventional methods of breeding or genetic engineering. Several cultivated plants have been rendered tolerant to herbicides by conventional methods of breeding (mutagenesis), for example Clearfield® summer rape (Canola) being tolerant to imidazolinones, e.g. imazamox. Genetic engineering methods have been used to render cultivated plants, such as soybean, cotton, corn, beets and rape, tolerant to herbicides, such as glyphosate and glufosinate, some of which are commercially available under the trade names RoundupReady® (glyphosate) and LibertyLine® (glufosinate).

The term "cultivated plants" is to be understood also including plants that are by the use of recombinant DNA techniques capable to synthesize one or more insecticidal proteins, especially those known from the bacterial genus Bacillus, particularly from Bacillus thuringiensis, such as δ-endotoxins, e.g. CrylA(b), CrylA(c), CrylF, Cryl F(a2), Cryl IA(b), CryIIIA, CryIIIB(b1) or Cry9c; vegetative insecticidal proteins (VIP), e.g. VIP1, VIP2, VIP3 or VIP3A; insecticidal proteins of bacteria colonizing nematodes, for example *Photorhabdus* ssp. or *Xenorhabdus* ssp.; toxins produced by animals, such as scorpion toxins, arachnid toxins, wasp toxins, or other insect-specific neurotoxins; toxins produced by fungi, such Streptomycetes toxins, plant lectins, such as pea or barley lectins; agglutinins; proteinase inhibitors, such as trypsin inhibitors, serine protease inhibitors, patatin, cystatin or papain inhibitors; ribosome-inactivating proteins (RIP), such as ricin, maize-RIP, abrin, luffin, saporin or bryodin; steroid metabolism enzymes, such as 3-hydroxysteroid oxidase, ecdysteroid-IDP-glycosyl-transferase, cholesterol oxidases, ecdysone inhibitors or HMG-CoA-reductase; ion channel blockers, such as blockers of sodium or calcium channels; juvenile hormone esterase; diuretic hormone receptors (helicokinin receptors); stilben synthase, bibenzyl synthase, chitinases or glucanases. In the context of the present invention these insecticidal proteins or toxins are to be understood expressly also as pre-toxins, hybrid proteins, truncated or otherwise modified proteins. Hybrid proteins are characterized by a new combination of protein domains, (see, for example WO 02/015701). Further examples of such toxins or genetically-modified plants capable of synthesizing such toxins are dis-closed, for example, in EP-A 374 753, WO 93/007278, WO 95/34656, EP-A 427 529, EP-A 451 878, WO 03/018810 and WO 03/052073. The methods for producing such genetically modified plants are generally known to the person skilled in the art and are described, for example, in the publications mentioned above. These insecticidal proteins contained in the genetically modified plants impart to the plants producing these proteins tolerance to harmful pests from all taxonomic groups of insects, especially to beetles (Coeloptera), two-winged insects (Diptera), and butterflies (Lepidoptera).

The term "cultivated plants" is to be understood also including plants that are by the use of recombinant DNA techniques capable to synthesize one or more proteins to in-crease the resistance or tolerance of those plants to bacterial, viral or fungal pathogens. Examples of such proteins are the so-called "pathogenesis-related proteins" (PR proteins, see, for example EP-A 392 225), plant disease resistance genes (for example potato cultivars, which express resistance genes acting against Phytophthora infestans derived from the mexican wild potato Solanum blbocastanum) or T4-lysozym (e.g. potato cultivars capable of synthesizing these proteins with increased resistance against bacteria such as *Erwinia amylvora*). The methods for producing such genetically modified plants are generally known to the person skilled in the art and are described, for example, in the publications mentioned above.

The term "cultivated plants" is to be understood also including plants that are by the use of recombinant DNA techniques capable to synthesize one or more proteins to increase the productivity (e.g. bio mass production, grain yield, starch content, oil content or protein content), tolerance to drought, salinity or other growth-limiting environmental factors or tolerance to pests and fungal, bacterial or viral pathogens of those plants.

The term "cultivated plants" is to be understood also including plants that contain by the use of recombinant DNA techniques a modified amount of substances of content or new substances of content, specifically to improve human or animal nutrition, e.g. oil crops that produce health-promoting long-chain omega-3 fatty acids or unsaturated omega-9 fatty acids (e.g. Nexera® rape).

The term "cultivated plants" is to be understood also including plants that contain by the use of recombinant DNA techniques a modified amount of substances of content or new substances of content, specifically to improve raw material production, e.g. potatoes that produce increased amounts of amylopectin (e.g. Amflora® potato).

Some of the inventive mixtures have systemic action and can therefore be used for the protection of the plant shoot against foliar pests as well as for the treatment of the seed and roots against soil pests.

The mixtures according to the present invention are therfore suitable for the treatment of seeds in order to protect the seed from insect pest, in particular from soil-living insect pests and the resulting plants' roots and shoots against soil pests and foliar insects.

The protection of the resulting plant's roots and shoots is preferred.

More preferred is the protection of resulting plant's shoots from piercing and sucking insects.

The present invention therefore comprises a method for the protection of seeds from insects, in particular from soil insects and of the seedlings' roots and shoots from insects, in particular from soil and foliar insects, said method comprising contacting the seeds before sowing and/or after pregermination with mixtures according to the present invention. Particularly preferred is a method, wherein the plant's roots and shoots are protected, more preferably a method, wherein the plants shoots are protected from piercing and sucking insects, most preferably a method, wherein the plants shoots are protected from aphids.

The term seed embraces seeds and plant propagules of all kinds including but not limited to true seeds, seed pieces, suckers, corms, bulbs, fruit, tubers, grains, cuttings, cut shoots and the like and means in a preferred embodiment true seeds.

The term seed treatment comprises all suitable seed treatment techniques known in the art, such as seed dressing, seed coating, seed dusting, seed soaking and seed pelleting.

The present invention also comprises seeds coated with or containing the active compound(s). The term "coated with and/or containing" generally signifies that the active ingredient(s) are for the most part on the surface of the propagation product at the time of application, although a greater or lesser part of the ingredient may penetrate into the propagation product, depending on the method of application. When the said propagation products are (re)planted, it may absorb the active ingredient.

Suitable seeds are seeds of cereals, root crops, oil crops, vegetables, spices, ornamentals, for example seed of durum and other wheat, barley, oats, rye, maize (fodder maize and sugar maizeisweet and field corn), soybeans, oil crops, crucifers, cotton, sunflowers, bananas, rice, oilseed rape, turnip rape, sugarbeet, fodder beet, eggplants, potatoes, grass, lawn, turf, fodder grass, tomatoes, leeks, pumpkinisquash, cabbage, iceberg lettuce, pepper, cucumbers, melons, Brassica species, melons, beans, peas, garlic, onions, carrots, tuberous plants such as potatoes, sugar cane, tobacco, grapes, petunias, geraniumipelargoniums, pansies and impatiens.

In addition, the mixtures according to the invention may also be used for the treatment seeds from plants, which tolerate the action of herbicides or fungicides or insecticides owing to breeding, including genetic engineering methods.

For example, the active mixtures can be employed in treatment of seeds from plants, which are resistant to herbicides from the group consisting of the sulfonylureas, imidazolinones, glufosinate-ammonium or glyphosate-isopropylammonium and analogous active substances (see for example, EP-A 242 236, EP-A 242 246) (WO 92/00377) (EP-A 257 993, U.S. Pat. No. 5,013,659) or in transgenic crop plants, for example cotton, with the capability of producing Bacillus thuringiensis toxins (Bt toxins) which make the plants resistant to certain pests (EP-A 142 924, EP-A 193 259).

Furthermore, the mixtures according to the present invention can be used also for the treatment of seeds from plants, which have modified characteristics in comparison with existing plants consist, which can be generated for example by traditional breeding methods and/or the generation of mutants, or by recombinant procedures). E.g. a number of cases have been described of recombinant modifications of crop plants for the purpose of modifying the starch synthesized in the plants (e.g. WO 92/11376, WO 92/14827, WO 91/19806) or of transgenic crop plants having a modified fatty acid composition (WO 91/13972).

The seed treatment application of the mixtures is carried out by spraying or by dusting the seeds before sowing of the plants and before emergence of the plants.

In the treatment of seeds the corresponding formulations are applied by treating the seeds with an effective amount of the mixtures of the invention. Herein, the application rates of the active compound(s) are generally from 0.1 g to 10 kg per 100 kg of seed, preferably from 1 g to 5 kg per 100 kg of seed, in particular from 1 g to 2,5 kg per 100 kg of seed. For specific crops such as lettuce the rate can be higher.

Compositions, which are especially useful for seed treatment are e.g.:

A Soluble concentrates (SL, LS)
D Emulsions (EW, EO, ES)
E Suspensions (SC, OD, FS)
F Water-dispersible granules and water-soluble granules (WG, SG)
G Water-dispersible powders and water-soluble powders (WP, SP, WS)
H Gel-Formulations (GF)
I Dustable powders (DP, DS)

Conventional seed treatment formulations include for example flowable concentrates FS, solutions LS, powders for dry treatment DS, water dispersible powders for slurry treatment WS, water-soluble powders SS and emulsion ES and EC and gel formulation GF. These formulations can be applied to the seed diluted or undiluted. Application to the seeds is carried out before sowing, either directly on the seeds or after having pregerminated the latter In a preferred embodiment a FS formulation is used for seed treatment. Typcially, a FS formulation may comprise 1-800 g/l of active ingredient(s), 1-200 g/l Surfactant, 0 to 200 g/l antifreezing agent, 0 to 400 g/l of binder, 0 to 200 g/l of a pigment and up to 1 liter of a solvent, preferably water.

Preferred FS formulations of mixtures for seed treatment usually comprise from 0.1 to 80% by weight (1 to 800 g/l) of the active ingredients, from 0.1 to 20% by weight (1 to 200 g/l) of at least one surfactant, e.g. 0.05 to 5% by weight of a wetter and from 0.5 to 15% by weight of a dispersing agent, up to 20% by weight, e.g. from 5 to 20% of an anti-freeze agent, from 0 to 15% by weight, e.g. 1 to 15% by weight of a pigment and/or a dye, from 0 to 40% by weight, e.g. 1 to 40% by weight of a binder (sticker iadhesion agent), optionally up to 5% by weight, e.g. from 0.1 to 5% by weight of a thickener, optionally from 0.1 to 2% of an anti-foam agent, and optionally a preservative such as a biocide, antioxidant or the like, e.g. in an amount from 0.01 to 1% by weight and a fillerivehicle up to 100% by weight.

Seed treatment formulations may additionally also comprise binders and optionally colorants.

Binders can be added to improve the adhesion of the active materials on the seeds after treatment. Suitable binders are block copolymers EO/PO surfactants but also polyvinylalcoholsl, polyvinylpyrrolidones, polyacrylates, polymethacrylates, polybutenes, polyisobutylenes, polystyrene, polyethyleneamines, polyethyleneamides, polyethyleneimines (Lupasol®, Polymin®), polyethers, polyurethans, polyvinylacetate, tylose and copolymers derived from these polymers.

Optionally, also colorants can be included in the formulation. Suitable colorants or dyes for seed treatment formulations are Rhodamin B, C. I. Pigment Red 112, C. I. Solvent Red 1, pigment blue 15:4, pigment blue 15:3, pigment blue 15:2, pigment blue 15:1, pigment blue 80, pigment yellow 1, pigment yellow 13, pigment red 112, pigment red 48:2, pigment red 48:1, pigment red 57:1, pigment red 53:1, pigment orange 43, pigment orange 34, pigment orange 5, pigment green 36, pigment green 7, pigment white 6, pigment brown 25, basic violet 10, basic violet 49, acid red 51, acid red 52, acid red 14, acid blue 9, acid yellow 23, basic red 10, basic red 108.

The invention also relates to seed comprising mixtures according to the invention. The amount of the mixture or the agriculturally useful salt thereof will in general vary from 0.1 g to 10 kg per 100 kg of seed, preferably from 1 g to 5 kg per 100 kg of seed, in particular from 1 g to 1000 g per 100 kg of seed.

The mixtures of the invention are in particular also suitable for being used for combating parasites in and on animals.

An object of the present invention is therfore also to provide new methods to control parasites in and on animals. Another object of the invention is to provide safer pesticides for animals. Another object of the invention is further to provide pesticides for animals that may be used in lower doses than existing pesticides. And another object of the invention is to provide pesticides for animals, which provide a long residual control of the parasites.

The invention also relates to compositions containing a parasiticidally effective amount of compounds of formula I or the enantiomers or veterinarily acceptable salts thereof and an acceptable carrier, for combating parasites in and on animals.

The present invention also provides a method for treating, controlling, preventing and protecting animals against infestation and infection by parasites, which comprises orally, topically or parenterally administering or applying to the animals a parasiticidally effective amount of mixture of the present invention or a composition comprising it or the inventive compound.

The invention also provides a process for the preparation of a composition for treating, controlling, preventing or protecting animals against infestation or infection by parasites which comprises a parasiticidally effective amount of a mixture of the present invention or a composition comprising it or a compound according to the invention.

Activity of compounds against agricultural pests does not suggest their suitability for control of endo- and ectoparasites in and on animals which requires, for example, low, non-emetic dosages in the case of oral application, metabolic compatibility with the animal, low toxicity, and a safe handling.

Surprisingly it has now been found that mixtures of the present invention are suitable for combating endo- and ectoparasites in and on animals. Surprisingly it has now been found that the inventive compounds I are suitable for combating endo- and ectoparasites in and on animals.

Mixtures of the present invention and compositions comprising them are preferably used for controlling and preventing infestations and infections animals including warm-blooded animals (including humans) and fish. They are for example suitable for controlling and preventing infestations and infections in mammals such as cattle, sheep, swine, camels, deer, horses, pigs, poultry, rabbits, goats, dogs and cats, water buffalo, donkeys, fallow deer and reindeer, and also in fur-bearing animals such as mink, chinchilla and raccoon, birds such as hens, geese, turkeys and ducks and fish such as fresh- and salt-water fish such as trout, carp and eels.

Inventive compounds I, mixtures of the present invention and compositions comprising them are preferably used for controlling and preventing infestations and infections in domestic animals, such as dogs or cats.

Infestations in warm-blooded animals and fish include, but are not limited to, lice, biting lice, ticks, nasal bots, keds, biting flies, muscoid flies, flies, myiasitic fly larvae, chiggers, gnats, mosquitoes and fleas.

The inventive compounds, the mixtures of the present invention and compositions comprising them are suitable for systemic and/or non-systemic control of ecto- and/or endoparasites. They are active against all or some stages of development.

The mixtures of the present invention are especially useful for combating ectoparasites.

The mixture of the present invention is especially useful for combating parasites of the following orders and species, respectively:

fleas (*Siphonaptera*), e.g. *Ctenocephalides fells, Ctenocephalides canis, Xenopsylla cheopis, Pulex irritans, Tunga penetrans*, and *Nosopsyllus fasciatus*, cockroaches (*Blattaria-Blattodea*), e.g. *Blattella germanica, Blattella asahinae, Periplaneta americana, Periplaneta japonica, Periplaneta brunnea, Periplaneta fuligginosa, Periplaneta australasiae*, and *Blatta orientalis*, flies, mosquitoes (*Diptera*), e.g. *Aedes aegypti, Aedes albopictus, Aedes vexans, Anastrepha ludens, Anopheles maculipennis, Anopheles crucians, Anopheles albimanus, Anopheles gambice, Anopheles freeborni, Anopheles leucosphyrus, Anopheles minimus, Anopheles quadrimaculatus, Calliphora vicina, Chrysomya bezziana, Chrysomya hominivorax, Chrysomya macellane, Chrysops discallS, Chrysops silacea, Chrysops atlanticus, Cochliomyia hominivorax, Cordylobia anthropophaga, Culicoides furens, Culex pipiens, Culex nigripalpus, Culex quinquefasciatus, Culex tarsalis, Culiseta inomata, Culiseta melanura, Dermatobia hominis, Fannia canicularis, Gasterophilus intestinalis, Glossina morsitans, Glossina palpaks, Glossina fuscipes, Glossina tachinoides, Haematobia irritans, Haplodiplosis equestris, Hippelates* ssp., *Hypoderma lineata, Leptoconops torrens, Lucllia caprin, Lucilia cuprina, Lucilia sericata, Lycoria pectoralis, Mansonia* ssp., *Musca dourestica, Muscina stabulans, Oestrus ovis, Phlebotomus argentipes, Psorophora columbiae, Psorophora discolor, Prosimulium mbdum, Sarcophaga haemorrhoidalis, Sarcophaga* sp., *Simulium viltatum, Stomoxys calcitrans, Tabanus bovinus, Tabanus atratus, Tabanus lineola*, and *Tabanus simills*, lice (*Phthiraptera*), e.g. *Pediculus humanus capitis, Pediculus humanus corporis, Pthirus pubis, Haematopinus eurysternus, Haematopinus suis, Linognathus vituli, Bovicola bovis, Menopon gallinae, Menacanthus stramineus* and *Solenopotes capillatus*.

ticks and parasitic mites (*Parasitiformes*): ticks (*Ixodida*), e.g. *Ixodes scapularis, Ixodes holocyclus, Ixodes pacificus, Rhiphicephalus sanguineus, Dermacentor andersoni, Dermacentor vanabilis, Amblyomma americanum, Ambryomma maculatum, Ornithodorus hermsi, Ornithodorus turicata* and parasitic mites (*Mesostigmata*), e.g. *Ornithonyssus bacoti* and *Dermanyssus gallinae*, Actinedida (*Prostigmata*) and Acaridida (*Astigmata*) e.g. *Acarapis* ssp., *Cheyletiella* ssp., *Ornithocheyletia* ssp., *Myobia* ssp., *Psorergates* ssp., *Demodex* ssp., *Trombicula* ssp., *Listrophorus* ssp., *Acarus* ssp., *Tyrophagus* ssp., *Caloglyphus* ssp., *Hypodectes* ssp., *Pterolichus* ssp., *Psoroptes* ssp., *Chorioptes* ssp., *Otodectes* ssp., *Sarcoptes* ssp., *Notoedres* ssp., *Knemidocoptes* ssp., *Cytodlles* ssp., and *Laminosioptes* ssp, Bugs (*Heteropterida*): *Cimex lectularius, Cimex hemipterus, Reduvius senilis, Triatoma* ssp., *Rhodnius* ssp., *Panstrongylus* ssp. and *Arilus critatus*, Anopluhda, e.g. *Haematopinus* ssp., *Linognathus* ssp., *Pediculus* ssp., *Phtirus* ssp., *and Solenopotes* ssp, Mallophagida (suborders Arnblycerina and Ischnocerina), e.g. *Trimenopon* ssp., *Menopon* ssp., *Trinoton* ssp., *Bovicola* ssp., *Werneckiella* ssp., *Lepikentron* ssp., *Trichodectes* ssp., and *Felicola* ssp, Roundworms Nematoda:

Wipeworms and Trichinosis (Trichosyringida), e.g. Trichinellidae (*Trichinella* ssp.), (Trichuridae) *Trichuris* ssp., *Capillaria* ssp, Rhabditida, e.g. *Rhabditis* ssp, *Strongyloides* ssp., *Helicephalobus* ssp, Strongylida, e.g. *Strongylus* ssp., *Ancylostoma* ssp., *Necator americanus, Bunostomum* ssp. (Hookworm), *Trichostrongylus* ssp., *Haemonchus contortus., Ostertagia* ssp., *Cooperia* ssp., *Nematodirus* ssp., *Dictyocaulus* ssp., *Cyathostoma* ssp., *Oesophagostomum* ssp., *Stephanurus dentatus, Ollulanus* ssp., *Chabertia* ssp., *Stephanurus dentatus , Syngamus trachea, Ancylostoma* ssp., *Uncinaria* ssp., *Globocephalus* ssp., *Necator* ssp., *Metastrongylus* ssp., *Muellerius capillaris, Protostrongylus* ssp., *Angiostrongylus* ssp., *Parelaphostrongylus* ssp. *Aleurostrongylus abstrusus*, and *Dioctophyma renale*, Intestinal roundworms (*Ascaridida*), e.g. *Ascaris lumbricoides, Ascaris suum, Ascaridia galli, Parascaris equorum, Enterobius vermicularis* (Threadworm), *Toxocara canis, Toxascaris leonine, Skrjabinema* ssp., and *Oxyuris aqui*, Camallanida, e.g. *Dracunculus medinensis* (guinea worm)

Spirurida, e.g. *Thelazia* ssp. *Wuchereria* ssp., *Brugia* ssp., *Onchocerca* ssp., *Dirotllari* ssp. a, *Dipetalonema* ssp., *Setaria* ssp., *Elaeophora* ssp., *Spirocerca lupi*, and *Habronema* ssp., Thorny headed worms (Acanthocephala), e.g. *Acanthocephaius* ssp., *Macracanthorhynchus hiructinaceus* and *Oncicola* ssp, Planarians (*Plathelminthes*):

Flukes (*Trematoda*), e.g. *Faciola* ssp., *Fascioloides magna, Paragonimus* ssp., *Dicrocoelium* ssp., *Fasciolopsis buski, Clonorchis sinensis, Schistosoma* ssp., *Trichobilharzia* ssp., *Alaria alata, Paragonimus* ssp., and *Nanocyetes* ssp, Cercomeromorpha, in particular Cestoda (Tapeworms), e.g. *Diphyllobothrium* ssp., *Tenia* ssp., *Echinococcus* ssp., *Dipyliclium caninum, Multiceps* ssp., *Hymenoleps* ssp., *Mesocestoicies* ssp., *Vampiroleps* ssp., *Moniezia* ssp., *Anoplocephala* ssp., *Sirometra* ssp., *Anoplocephala* ssp., and *Hymenoleps* ssp.

The mixtures of the invention and compositions containing them are particularly useful for the control of pests from the orders *Diptera*, *Siphonaptera* and *Ixodida*.

Moreover, the mixtures of the invention and compositions containing them for combating mosquitoes is especially preferred.

The use of mixtures of the invention and compositions containing them for combating flies is a further preferred embodiment of the present invention.

Furthermore, the use of the mixtures of the invention and compositions containing them for combating fleas is especially preferred.

The use of mixtures of the invention and compositions containing them for combating ticks is a further preferred embodiment of the present invention.

The mixtures of the present invention also are especially useful for combating endoparasites (roundworms nematoda, thorny headed worms and planarians).

Administration can be carried out both prophylactically and therapeutically.

Administration of the active compound(s) is carried out directly or in the form of suitable preparations, orally, topicallyidermally or parenterally.

For oral administration to warm-blooded animals, the mixtures of the present invention may be formulated as animal feeds, animal feed premixes, animal feed concentrates, pills, solutions, pastes, suspensions, drenches, gels, tablets, boluses and capsules. In addition, the mixtures of the present invention may be administered to the animals in their drinking water. For oral administration, the dosage form chosen should provide the animal with 0.01 mg/kg to 100 mg/kg of animal body weight per day of the formula I compound, preferably with 0.5 mg/kg to 100 mg/kg of animal body weight per day.

Alternatively, the mixtures of the present invention may be administered to animals parenterally, e.g., by intraruminal, intramuscular, intravenous or subcutaneous injection. The mixture compounds may be dispersed or dissolved in a physiologically acceptable carrier for subcutaneous injection. Alternatively, the mixtures of the present invention may be formulated into an implant for subcutaneous administration. In addition the mixture compounds may be transdermally administered to animals. For parenteral administration, the dosage form chosen should provide the animal with 0.01 mg/kg to 100 mg/kg of animal body weight per day of the active compounds.

The mixtures of the invention may also be applied topically to the animals in the form of dips, dusts, powders, collars, medallions, sprays, shampoos, spot-on and pour-on formulations and in ointments or oil-in-water or water-in-oil emulsions. For topical application, dips and sprays usually contain 0.5 ppm to 5,000 ppm and preferably 1 ppm to 3,000 ppm of the active compounds. In addition, the active compound mixtures may be formulated as ear tags for animals, particularly quadrupeds such as cattle and sheep.

Suitable preparations are:
Solutions such as oral solutions, concentrates for oral administration after dilution, solutions for use on the skin or in body cavities, pouring-on formulations, gels;
Emulsions and suspensions for oral or dermal administration; semi-solid preparations;
Formulations in which the active compound is processed in an ointment base or in an oil-in-water or water-in-oil emulsion base;
Solid preparations such as powders, premixes or concentrates, granules, pellets, tablets, boluses, capsules; aerosols and inhalants, and active compound-containing shaped articles.

Compositions suitable for injection are prepared by dissolving the active ingredient in a suitable solvent and optionally adding further ingredients such as acids, bases, buffer salts, preservatives, and solubilizers. The solutions are filtered and filled sterile.

Suitable solvents are physiologically tolerable solvents such as water, alkanols such as ethanol, butanol, benzyl alcohol, glycerol, propylene glycol, polyethylene glycols, N-methyl-pyrrolidone, 2-pyrrolidone, and mixtures thereof.

The active compounds can optionally be dissolved in physiologically tolerable vegetable or synthetic oils which are suitable for injection.

Suitable solubilizers are solvents which promote the dissolution of the active compound in the main solvent or prevent its precipitation. Examples are polyvinylpyrrolidone, polyvinyl alcohol, polyoxyethylated castor oil, and polyoxyethylated sorbitan ester.

Suitable preservatives are benzyl alcohol, trichlorobutanol, p-hydroxybenzoic acid esters, and n-butanol.

Oral solutions are administered directly. Concentrates are administered orally after prior dilution to the use concentration. Oral solutions and concentrates are prepared according to the state of the art and as described above for injection solutions, sterile procedures not being necessary.

Solutions for use on the skin are trickled on, spread on, rubbed in, sprinkled on or sprayed on.

Solutions for use on the skin are prepared according to the state of the art and according to what is described above for injection solutions, sterile procedures not being necessary.

Further suitable solvents are polypropylene glycol, phenyl ethanol, phenoxy ethanol, ester such as ethyl or butyl acetate, benzyl benzoate, ethers such as alkyleneglycol alkylether, e.g. dipropylenglycol monomethylether, ketons such as acetone, methylethylketone, aromatic hydrocarbons, vegetable and synthetic oils, dimethylformamide, dimethylacetamide, transcutol, solketal, propylencarbonate, and mixtures thereof.

It may be advantageous to add thickeners during preparation. Suitable thickeners are inorganic thickeners such as bentonites, colloidal silicic acid, aluminium monostearate, organic thickeners such as cellulose derivatives, polyvinyl alcohols and their copolymers, acrylates and methacrylates.

Gels are applied to or spread on the skin or introduced into body cavities. Gels are prepared by treating solutions which have been prepared as described in the case of the injection solutions with sufficient thickener that a clear material having an ointment-like consistency results.

The thickeners employed are the thickeners given above.

Pour-on formulations are poured or sprayed onto limited areas of the skin, the active compound penetrating the skin and acting systemically.

Pour-on formulations are prepared by dissolving, suspending or emulsifying the active compound in suitable skin-compatible solvents or solvent mixtures. If appropriate, other auxiliaries such as colorants, bioabsorption-promoting substances, antioxidants, light stabilizers, adhesives are added.

Suitable solvents which are: water, alkanols, glycols, polyethylene glycols, polypropylene glycols, glycerol, aromatic alcohols such as benzyl alcohol, phenylethanol, phenoxyethanol, esters such as ethyl acetate, butyl acetate, benzyl benzoate, ethers such as alkylene glycol alkyl ethers such as dipropylene glycol monomethyl ether, diethylene glycol mono-butyl ether, ketones such as acetone, methyl ethyl ketone, cyclic carbonates such as propylene carbonate, ethylene carbonate, aromatic and/or aliphatic hydrocarbons, vegetable or synthetic oils, DMF, dimethylacetamide, N-alkylpyrrolidones such as methylpyrrolidone, N-butylpyrrolidone or N-octylpyrrolidone, N-methylpyrrolidone, 2-pyrrolidone, 2,2-dimethyl-4-oxy-methylene-1,3-dioxolane and glycerol formal.

Suitable colorants are all colorants permitted for use on animals and which can be dissolved or suspended.

Suitable absorption-promoting substances are, for example, DMSO, spreading oils such as isopropyl myristate, dipropylene glycol pelargonate, silicone oils and copolymers thereof with polyethers, fatty acid esters, triglycerides, fatty alcohols.

Suitable antioxidants are sulfites or metabisulfites such as potassium metabisulfite, ascorbic acid, butylhydroxytoluene, butylhydroxyanisole, tocopherol.

Suitable light stabilizers are, for example, novantisolic acid.

Suitable adhesives are, for example, cellulose derivatives, starch derivatives, polyacrylates, natural polymers such as alginates, gelatin.

Emulsions can be administered orally, dermally or as injections.

Emulsions are either of the water-in-oil type or of the oil-in-water type.

They are prepared by dissolving the active compound either in the hydrophobic or in the hydrophilic phase and homogenizing this with the solvent of the other phase with the aid of suitable emulsifiers and, if appropriate, other auxiliaries such as colorants, absorption-promoting substances, preservatives, antioxidants, light stabilizers, viscosity-enhancing substances.

Suitable hydrophobic phases (oils) are:

liquid paraffins, silicone oils, natural vegetable oils such as sesame oil, almond oil, castor oil, synthetic triglycerides such as caprylicicapric biglyceride, triglyceride mixture with vegetable fatty acids of the chain length $C_8$-$C_{12}$ or other specially selected natural fatty acids, partial glyceride mixtures of saturated or unsaturated fatty acids possibly also containing hydroxyl groups, mono- and diglycerides of the $C_8$-$C_{10}$ fatty acids, fatty acid esters such as ethyl stearate, di-n-butyryl adipate, hexyl laurate, dipropylene glycol perlargonate, esters of a branched fatty acid of medium chain length with saturated fatty alcohols of chain length $C_{16}$-$C_{18}$, isopropyl myristate, isopropyl palmitate, caprylicicapric acid esters of saturated fatty alcohols of chain length $C_{12}$-$C_{18}$, isopropyl stearate, oleyl oleate, decyl oleate, ethyl oleate, ethyl lactate, waxy fatty acid esters such as synthetic duck coccygeal gland fat, dibutyl phthalate, diisopropyl adipate, and ester mixtures related to the latter, fatty alcohols such as isotridecyl alcohol, 2-octyldodecanol, cetylstearyl alcohol, oleyl alcohol, and fatty acids such as oleic acid and mixtures thereof.

Suitable hydrophilic phases are: water, alcohols such as propylene glycol, glycerol, sorbitol and mixtures thereof.

Suitable emulsifiers are:

non-ionic surfactants, e.g. polyethoxylated castor oil, polyethoxylated sorbitan monooleate, sorbitan monostearate, glycerol monostearate, polyoxyethyl stearate, alkylphenol polyglycol ether;

ampholytic surfactants such as di-sodium N-lauryl-p-iminodipropionate or lecithin;

anionic surfactants, such as sodium lauryl sulfate, fatty alcohol ether sulfates, monoidialkyl polyglycol ether orthophosphoric acid ester monoethanolamine salt;

cation-active surfactants, such as cetyltrimethylammonium chloride.

Suitable further auxiliaries are: substances which enhance the viscosity and stabilize the emulsion, such as carboxymethylcellulose, methylcellulose and other cellulose and starch derivatives, polyacrylates, alginates, gelatin, gum arabic, polyvinylpyrrolidone, polyvinyl alcohol, copolymers of methyl vinyl ether and maleic anhydride, polyethylene glycols, waxes, colloidal silicic acid or mixtures of the substances mentioned.

Suspensions can be administered orally or topicallyidermally. They are prepared by suspending the active compound in a suspending agent, if appropriate with addition of other auxiliaries such as wetting agents, colorants, bioabsorption-promoting substances, preservatives, antioxidants, light stabilizers.

Liquid suspending agents are all homogeneous solvents and solvent mixtures.

Suitable wetting agents (dispersants) are the emulsifiers given above.

Other auxiliaries which may be mentioned are those given above.

Semi-solid preparations can be administered orally or topicallyidermally. They differ from the suspensions and emulsions described above only by their higher viscosity.

For the production of solid preparations, the active compound(s) is mixed with suitable excipients, if appropriate with addition of auxiliaries, and brought into the desired form.

Suitable excipients are all physiologically tolerable solid inert substances. Those used are inorganic and organic substances. Inorganic substances are, for example, sodium chloride, carbonates such as calcium carbonate, hydrogencarbonates, aluminium oxides, titanium oxide, silicic acids, argillaceous earths, precipitated or colloidal silica, or phosphates. Organic substances are, for example, sugar, cellulose, foodstuffs and feeds such as milk powder, animal meal, grain meals and shreds, starches.

Suitable auxiliaries are preservatives, antioxidants, and/or colorants which have been mentioned above.

Other suitable auxiliaries are lubricants and glidants such as magnesium stearate, stearic acid, talc, bentonites, disintegration-promoting substances such as starch or crosslinked polyvinylpyrrolidone, binders such as starch, gelatin or linear polyvinylpyrrolidone, and dry binders such as microcrystalline cellulose.

In general, "parasiticidally effective amount" means the amount of active ingredient needed to achieve an observable effect on growth, including the effects of necrosis, death, retardation, prevention, and removal, destruction, or otherwise diminishing the occurrence and activity of the target organism. The parasiticidally effective amount can vary for the various compounds/compositions used in the invention. A parasiticidally effective amount of the compositions will also vary according to the prevailing conditions such as desired parasiticidal effect and duration, target species, mode of application, and the like.

The compositions which can be used in the invention can comprise generally from about 0.001 to 95 wt % of the active compoundsof the mixtures of the present invention.

Generally it is favorable to apply the active compounds of the mixtures of the present invention in total amounts of 0.5 mg/kg to 100 mg/kg per day, preferably 1 mg/kg to 50 mg/kg per day.

Ready-to-use preparations contain the active compounds of the mixtures of the present invention acting against parasites, preferably ectoparasites, in concentrations of 10 ppm to 80 per cent by weight, preferably from 0.1 to 65 per cent by weight, more preferably from 1 to 50 per cent by weight, most preferably from 5 to 40 per cent by weight.

Preparations which are diluted before use contain the active compounds of the mixtures of the present invention acting against ectoparasites in concentrations of 0.5 to 90 per cent by weight, preferably of 1 to 50 per cent by weight.

Furthermore, the preparations comprise the active compounds of the mixtures of the present invention against endoparasites in concentrations of 10 ppm to 2 per cent by weight, preferably of 0.05 to 0.9 per cent by weight, very particularly preferably of 0.005 to 0.25 per cent by weight.

In a preferred embodiment of the present invention, the compositions comprising the mixtures of the present invention are applied dermallyitopically.

In a further preferred embodiment, the topical application is conducted in the form of compound-containing shaped articles such as collars, medallions, ear tags, bands for fixing at body parts, and adhesive strips and foils.

Generally it is favorable to apply solid formulations which release the active compounds of the mixtures of the present invention in total amounts of 10 mg/kg to 300 mg/kg, preferably 20 mg/kg to 200 mg/kg, most preferably 25 mg/kg to 160 mg/kg body weight of the treated animal in the course of three weeks.

For the preparation of the shaped articles, thermoplastic and flexible plastics as well as elastomers and thermoplastic elastomers are used. Suitable plastics and elastomers are polyvinyl resins, polyurethane, polyacrylate, epoxy resins, cellulose, cellulose derivatives, polyamides and polyester which are sufficiently compatible with the compounds of formula I. A detailed list of plastics and elastomers as well as preparation procedures for the shaped articles is given e.g. in WO 03/086075.

EXAMPLES

EXAMPLES

Synthesis Example: 3-(2-chlorothiazol-5-yl)-8-methyl-7-oxo-6-phenyl-2,3-dihydrothiazolo[3,2-a]pyrimidin-8-ium-5-olate (corresponding to compound I-1)

Step 1: 2-chloro-N-methoxy-N-methyl-acetamide

N-Methoxymethanamine hydrochloride (345 g) and water (1.5 L) were cooled to 0° C. To this reaction mixture, $K_2CO_3$ (1466 g) was added in lots, then methyl tert-butyl ether (1000 mL) was added at 0° C. The reaction mixture was cooled to −5° C. Chloroacetylchloride (400 g) in methyl tert-butyl ether (500 ml) was added drop wise at −5° C. to 0° C. and stirred for 2 hours at 0° C. The reaction mixture was allowed to come to 20-25° C. From the organic layer, the desired product was obtained as white solid (438 g, 90% yield; 98.45% HPLC purity).

Step 2: 2-chloro-1-(2-chlorothiazol-5-yl) ethanone 2-chlorothiazole (187 ml) in 750 ml tetrahydrofurane under nitrogen atmosphere were cooled to −20° C. Isopropylmagnesium chloride×LiCI (1684 ml, 1.3 molar in tetrahydrofurane) was added drop wise and stirred at −20° C. for 60 minutes. A solution of 2-chloro-N-methoxy-N-methyl-acetamide (250 g) in tetrahydrofurane was added drop wise at -20° C. to -25° C. The reaction mixture was stirred at −20° C. for 90 minutes. Saturated aqueous ammonium chloride solution was added at −20° C., then the reaction mixture was brought to 20-25° C. The two phases were separated and the aqueous phase was extracted with ethyl acetate. From the combined organic layers , the desired crude product was obtained as dark brown colored oil, which was treated with activated charcoal and silica in methyl tert-butyl ether to get the crude product as pale brown colored oil (335 g) for direct use in the next step.

Step 3: N-[2-chloro-1-(2-chlorothiazol-5-yl) ethylidene]-2-methyl-propane-2-sulfinamide To crude 2-chloro-1-(2-chlorothiazol-5-yl) ethanone (335 g) in tetrahydrofurane at 20-25° C. under nitrogen atmosphere, tert-butyl sulfinamide (206 g) and $Ti(OEt)_4$ (396 ml) are added. The mixture was heated to 50° C. and stirred for 2 hours, then cooled to 20-25° C. and diluted with ethyl acetate. After adding water, the mixture was stirred for 30 minutes, then filtered. The organic phase was evaporated to obtain the desired crude product as brown colored oil. After treatment with activated charcoal and silica in methyl tert-butyl ether, the crude product was obtained as pale brown colored oil (365 g) for direct use in the next step.

Step 4: N-[2-chloro-1-(2-chlorothiazol-5-yl) ethyl]-2-methyl-propane-2-sulfinamide To N-[2-chloro-1-(2-chlorothiazol-5-yl) ethylidene]-2-methyl-propane-2-sulfinamide (365 g) in tetrahydrofurane and methanole at −5° C., $NaBH_4$ (23 g) was added lot wise and stirred for 30 minutes. Saturated aqueous ammonium chloride solution was added at 0° C. After extracting with ethyl acetate, the organic layer yielded the desired crude product as brown colored oil (310 g).

Step 5: 2-chloro-1-(2-chlorothiazol-5-yl) ethanamine hydrochloride

N-[2-chloro-1-(2-chlorothiazol-5-yl) ethyl]-2-methyl-propane-2-sulfinamide was stirred with HCl in methanole (1 molar, 620 mL) at 20-25° C. for 12 hours. Removal of methanole under vacuum yielded a pale yellow sticky solid (244 g), which was washed with methyl tert-butyl ether and subsequently with ethyl acetate to get a pale yellow color solid (78 g, 26% yield over steps 2 to 5, >98% purity).

Step 6: 4-(2-chlorothiazol-5-yl)-N-methyl-thiazolidin-2-imine 2-chloro-1-(2-chlorothiazol-5-yl) ethanamine hydrochloride (285 g) in methyl tert-butyl ether and 2 molar aqueous NaOH solution (1060 mL) were stirred for 20 minutes at 23° C. The organic layer yielded the free amine as pale brown colored oil (230 g).

The amine (230 g) in ethanole was reacted with triethylamine NEt3 (351 ml) and Me-NCS (143.2 g) at 22 to 25° C. for 18 hours. The reaction mass was concentrated to obtain a brown colored residue, to which aqueous NaOH solution (114 g in 920 mL of water) was added. The resulting mixture was heated to 100° C. for 2 hours, then cooled to 20-25° C. and diluted with water . After extraction with ethyl acetate, the organic layer yielded crude 4-(2-chlorothiazol-5-yl)-N-methyl-thiazolidin-2-imine as brown colored solid (256 g), which was stirred with 20% ethyl acetate in heptane (300 mL) for 30 minutes. After filtering, the product was obtained as a brown colored solid (245 g, 85% yield).

Step 7: 3-(2-chlorothiazol-5-yl)-8-methyl-7-oxo-6-phenyl-2,3-dihydrothiazolo[3,2-a] pyrimidin-8-ium-5-olate (I-1)

4-(2-chlorothiazol-5-yl)-N-methyl-thiazolidin-2-imine (110 g) in toluene was stirred at 110 to 115° C. After adding bis(4-chlorophenyl) 2-phenylpropanedioate (226 g), the reaction mixture was stirred at this temperature for 2 hours, then cooled to 40 to 45° C. After removal of toluene under vacuum, a brown solid was obtained, which was triturated with methyl tert-butyl ether to obtain a yellow color solid.

Stirring in methyl tert-butyl ether (1 L) at 22 to 25° C. for 14 hours yielded a pale yellow solid (160 g). Further purification by dissolving in dichloromethane and precipitating with methyl tert-butyl ether yielded the desired product as fine pale yellow colored powder (129 g, 80% yield).

*: HPLC Method: Retention time in minutes; mass charge ratio m/z

HPLC Method A:

MSD4/5: Shimadzu Nexera UHPLC+Shimadzu LCMS 20-20, ESI

Column: Phenomenex Kinetex 1.7μm XB-$C_{18}$ 100A, 50×2, 1 mm

Mobile Phase: A: water+0.1% trifluoroacetic acid; B: acetonitrile, Temperature: 60° C.

Gradient: 5% B to 100% B in 1.50 min; 100% B 0.25 min
Flow: 0.8 ml/min to 1.0ml/min in 1.51 min
MS method: ESI positive, Mass range (m/z): 100-700
HPLC Method B:
MSD4/5: Shimadzu Nexera UHPLC+Shimadzu LCMS 20-20, ESI
Column: Agilent Eclipse Plus $C_{18, 50}$ mm×4.6 mm×3
Mobile phase: A=10 mM ammonium formate (0.1% Formic Acid) B=acetonitrile (0.1% Formic Acid), Flow=1.2 mlimin. Column oven: 30 C
Gradient=10% B to 100% B-1.5 min, hold for 1 min, 2.51 min-10% B; Run Time=3.50 min
HPLC Method C:
same as Method A, but MS method: ESI positive, Mass range (m/z): 100-1400
Example—Separation of the enantiomers:
R-3-(2-chlorothiazol-5-yl)-8-methyl-7-oxo-6-phenyl-2,3-dihydrothiazolo[3,2-a] pyrimidin-8-ium-5-olate and
S-3-(2-chlorothiazol-5-yl)-8-methyl-7-oxo-6-phenyl-2,3-dihydrothiazolo[3,2-a] pyrimidin-8-ium-5-olate The enantiomers of 3-(2-chlorothiazol-5-yl)-8-methyl-7-oxo-6-phenyl-2,3-dihydrothiazolo[3,2-a] pyrimidin-8-ium-5-olate from example 1 can be separated by preparative chiral supercritical fluid chromatography. 126 g of rac-3-(2-chlorothiazol-5-yl)-8-methyl-7-oxo-6-phenyl-2,3-dihydrothiazolo[3,2-a] pyrimidin-8-ium-5-olate were separated. This yielded 53.4 g of R-3-(2-chlorothiazol-5-yl)-8-methyl-7-oxo-6-phenyl-2,3-dihydrothiazolo[3,2-a] pyrimidin-8-ium-5-olate at a retention time of 1.94 min and 57.7 g of S-3-(2-chlorothiazol-5-yl)-8-methyl-7-oxo-6-phenyl-2,3-dihydrothiazolo[3,2-a] pyrimidin-8-ium-5-olate at a retention time of 1.41 min. These retention times refer to the analytical method cited below. The configuration of the chiral centre was determined by X-ray analysis.

Analytical separation method:
Instrument: Thar analytical SFC
Column: Chiralpak AS-H, 150×4.6 mm i.d., 5 u
Mobile phase: A for $CO_2$ and B for MeOH, Gradient: B %=40%
Flow rate: 4.0 mL/min, Back pressure: 100 bar, Column temperature: 35° C.
Wavelength: 220 nm
Preparative separation method:
Instrument: Thar 80 preparative SFC
Column: Chiralcel OJ-H, 250×30 mm I.D. 5 u
Mobile phase: A for $CO_2$ and B for $CH_3CN$, Gradient: B %=50%
Flow rate: 80 g/min, Back pressure: 100 bar, Column temperature: 40° C.
Wavelength: 220 nm
Cycletime: 6.5 min
Sample preparation: Racemic material was dissolved in mixed solution of MeOH-$CH_3$CN-DCM (1:1:0.5) to 20 mg/mL and filtrated through membrane with pore sized 0.45 um.
Injection: 4 mL per injection.
After separation, the fractions were dried off via rotary evaporator at bath temperature 35° C. to get the two enantiomers.

Preparation of compound of formula I with enantiomeric excess:
The characterization can be done by coupled High Performance Liquid Chromatography/mass spectrometry (HPLC/MS), Gas chromatography (GC), by NMR or by their melting points.

HPLC method: Agilent Eclipse Plus C18, 150 mm×4.6 mm ID×5 um
Gradient A=0.1% TFA in Water, B=0.1% TFA in Acetonitrile.
Flow=1.4 mlimin., column oven temperature=30 C
Gradient program=10% B-100% B-5 min, hold for 2 min, 3 min-10% B.
Run Time=10 min
LCMS method 1: C18 Column (50 mm×3.0 mm×3 μ)
Gradient A=10 Mm Ammonium formate in water, B=0.1% Formic acid in acetonitrile
Flow=1.2 ml/min., column oven temperature=40° C.
Gradient program=10% B to 100% B in 1.5 min., hold for 1 min 100% B, 1 min-10% B
Run time: 3.75 min
Chiral HPLC method 1: ChiralPak IA column, 150 mm×4.6 mm×5 μ
Mobile phase A=heptane, B=isopropanol,
Flow=1.0 mlimin, column oven temperature=40° C.
Gradient program=10% B Isocratic; run time: 20 min
Chiral HPLC method 3: ChiralPak IA column, 150 mm×4.6 mm×5 μ
Mobile phase A=heptane, B=isopropanol,
Flow=1.0 mlimin, column oven temperature=40° C.
Gradient program=40% B Isocratic; run time: 20 min $^1$H-NMR: The signals are characterized by chemical shift (ppm) vs. tetramethylsilane, by their multiplicity and by their integral (relative number of hydrogen atoms given). The following abbreviations are used to characterize the multiplicity of the signals: m=multiplet, q=quartet, t=triplet, d=doublet and s=singlet.

Abbreviations used are: h for hour(s), min for minute(s), rt for retention time and ambient temperature for 20-25° C.

Example 1: Preparation of compound of formula I-1 with enantiomeric excess of compound I-R-1 ((3R)-3-(2-chlorothiazol-5-yl)-8-methyl-7-oxo-6-phenyl-2,3-dihydrothiazolo[3,2-a]pyrimidin-4-ium-5-olate):

Step -1: Preparation of 2-chloro-N-methoxy-N-methyl-acetamide:

A 3 L four necked flask equipped with Teflon-blade stirrer, reflux condenser and thermo-pocket was charged with N-methoxymethanamine hydrochloride (345 g), water (1.6 litre) and the resulting reaction mixture was cooled to 0 to −5° C. Then potassium carbonate (1466 g) was added in lots to the above reaction mixture followed by the addition of methyl tert-butyl ether (1.4 litre). The chloroacetyl chloride (400 g) was dissolved in tert-butyl methyl ether (0.2 litre) and added dropwise in to the above kept reaction mixture at −5° C. to 0° C. and the reaction mixture was stirred for 2 h at 0° C. The reaction mixture was allowed to come to ambient temperature and two phases were separated. The organic layer was dried over sodium sulfate, filtered and evaporated to provide 2-chloro-N-methoxy-N-methyl-acetamide as white solid (440 g, 90% yield and 98.0% area purity by HPLC).

step-2: Preparation of 2-chloro-1-(2-chlorothiazol-5-yl)ethenone:

A 5 L, four necked flask equipped with Teflon-blade stirrer, reflux condenser and thermo-pocket was charged with 2-chlorothiazole (250 g), THF (0.75 L) and the resulting reaction mixture was cooled to 0 to -5° C. Then isopropylmagnesium chloride lithium chloride (1.929 L, 1.3 M solution in THF) was added over 0.5 h into the above kept reaction mixture at 0 to -5° C. The reaction mixture was then heated to 40° C. and the reaction was continued at 40° C. for 2h. The formation of chloro-(2-chlorothiazol-5-yl)magnesium species was confirmed by quenching the small aliquot of the reaction mixture with iodine and monitoring the formation of 2-chloro-5-iodothiazole by GC analysis (96% conversion was observed by GC analysis). The reaction mixture was cooled to 0 to −5° C. and the solution of 2-chloro-N-methoxy-N-methyl-acetamide (343 g) in THF (0.25 L) was added dropwise. The reaction was continued at −5 to 0° C. for 1 h and the reaction progress was monitored by H PLC. The reaction mixture was quenched with 1.5 N aq. HCl solution (1 L) at −5 to 0° C. and then warmed to ambient temperature. The two phases were separated and the aqueous phase extracted with methyl tert-butyl ether (2×300 mL). The combined organic layers were dried over sodium sulfate, filtered and evaporated to obtain crude residue. The crude product was dissolved in methyl tert-butyl ether (0.7 L) at ambient temperature and activated charcoal (4 g) and silica (80 g, 60-120 mesh) were added. The slurry was stirred for 0.5 h, filtered through Buchner funnel and washed with methyl tert-butyl ether (0.3 L). The filtrate was evaporated to obtain 2-chloro-1-(2-chlorothiazol-5-yl)ethanone as pale brown colored oil (409 g, 46% area purity by HPLC)

Step-3: Preparation of [2-(2-chlorothiazol-5-yl)-2-oxo-ethyl] acetate

A 0.25 L, three necked flask equipped with teflon-blade stirrer, reflux condenser and thermopocket was charged with 2-chloro-1-(2-chlorothiazol-5-yl)ethanone (15 g, 46area % HPLC purity) and dimethylformamide (45 mL) at ambient temperature. Then sodium acetate (12.55 g) was added in portions and reaction was continued at ambient temperature for 4 h. The reaction progress was monitored by HPLC (>95% conversion by HPLC). The reaction was quenched with water (50 mL) and extracted with methyl tert-butyl ether (3×100 mL). The two phases were separated and the combined organic phases were dried over sodium sulfate, filtered and evaporated to obtain crude residue (17 g). The crude product was purified by silica gel column chromatography to obtain [2-(2-chlorothiazol-5-yl)-2-oxo-ethyl] acetate as yellow colored solid (7.5 g).

Step -4: Preparation of 1-(2-chlorothiazol-5-yl)-2-hydroxy-ethanone

A 250 mL, three necked flask equipped with magnetic stirrer, reflux condenser and thermo-pocket was charged with [2-(2-chlorothiazol-5-yl)-2-oxo-ethyl] acetate (7.5 g) and 1 N HCl in MeOH (50 mL). The resulting solution was stirred for 5 h and reaction progress was monitored by TLC. The methanol from reaction mixture was distilled under vacuum and crude residue obtained was purified by column chromatography to obtain 1-(2-chlorothiazol-5-yl)-2-hydroxy-ethanone as pale yellow solid (2.8 g, 84% area purity by HPLC).

Step -5: Preparation of 4-(2-chlorothiazol-5-yl)-5H-oxathiazole 2,2-dioxide

A 100 mL, three neck flasks equipped with magnetic stirrer, reflux condenser and thermo-pocket was charged with 1-(2-chlorothiazol-5-yl)-2-hydroxy-ethanone (1 g), toluene (20 mL), chlorosulfonamide (0.975 g) and p-toluenesulfonic acid (0.214 g). The resulting solution was heated to 100° C. and stirred for 1 h. The reaction progress was monitored by HPLC (>95% conversion). The reaction mixture was quenched with water and extracted with MTBE (15 mL×2). The two phases were separated, organic phase was evaporated and purified by column chromatography 4-(2-chlorothiazol-5-yl)-5H-oxathiazole 2,2-dioxide (0.42 g).

Step -6: Preparation of (4R)-4-(2-chlorothiazol-5-yl)oxathiazolidine 2,2-dioxide a) Preparation of Rhodium catalyst—RhCl[(R,R)-TsDPEN]Cp*:

A 250 mL, three necked flask equipped with teflon-blade stirrer, nitrogen inlet and thermo-pocket was charged with [RhCl$_2$Cp*]$_2$ (2.0 g), (1 R, 2R)-N-p-toluenesulfonyl-1, 2-diphenylethylenediamine (2.38 g), dichloromethane (68 mL) and triethylamine (1.72 ml) under nitrogen atmosphere. The resulting slurry was stirred for 0.5 h at 22-27° C. and distilled water was added (40 mL). The two phases were separated and the organic phase was washed with water (40 mL). The organic phase was dried over sodium sulfate, filtered and evaporated to get brown coloured solid residue. The brown residue was triturated with n-heptane (20 mL), filtered and dried under nitrogen atmosphere to get obtain RhCl [(R, R)-TsDPEN]Cp* as red coloured solid (3.4 g).

b) Preparation of HCOOH-NEt$_3$ mixture:

In a 2 liter, 3 neck round bottom flask Formic acid (275 mL, >=99% w/w) was added and cooled to 0° C. To this, triethylamine 250 mL, >=99%w/w) was added slowly at 0° C. and used immediately in reaction.

c) Preparation of (4R)-4-(2-chlorothiazol-5-yl)oxathiazolidine 2,2-dioxide:

A 100 ml, two necked flask equipped with magnetic stirrer, condenser and thermo-pocket was charged with 4-(2-chlorothiazol-5-yl)-5H-oxathiazole 2,2-dioxide (0.5 g) and dimethylformamide (15 mL, 30V) was degassed with nitrogen for 10 min. Then RhCl[(RR)-TsDPEN]Cp* (27 mg) was added followed by dropwise addition of HCOOH-NEt$_3$ (2.5 mL, in a ratio of 5:2). The resulting mixture was stirred for 2 h. The HPLC showed >97% conversion. The reaction mixture was quenched with water (15 ml) and extracted with methyl tert-butyl ether (3×50 mL). The combined organic phase was evaporated to obtain (4R)-4-(2-chlorothiazol-5-yl)oxathiazolidine 2,2-dioxide (500 mg; 90area % HPLC purity (rt=3.645 min.), >99% ee by chiral HPLC method 1).

Step-7: Preparation of (4R)-4-(2-chlorothiazol-5-yl)-N-methyl-thiazolidin-2-imine A 100 mL, three necked flask equipped with magnetic stirrer, reflux condenser and thermo-pocket was charged with (4R)-4-(2-chlorothiazol-5-yl)oxathiazolidine 2,2-dioxide(0.5g, with 99% ee), ethanol (2 ml), methyl isothiocyanate (0.228 g) and triethylamine (0.56 ml) at ambient temperature. The resulting mixture was stirred for 14 h at 22-27° C. Then organic volatiles were removed under vacuum and sodium hydroxide (0.2 g) and water (2 mL) were added into the reaction flask. The reaction mixture was heated to 100° C. and stirred for 2 h. The reaction was diluted with water (2 mL) and extracted with methyl tert-butyl ether (2×50 mL). The organic phases were dried over sodium sulfate and evaporated under vacuum to provide (4R)-4-(2-chlorothiazol-5-yl)-N-methyl-thiazoliclin-2-imine as brown oil [0.34 g, m/z=234 amu (M+H$^+$)].

Step-8: Preparation of (3R)-3-(2-chlorothiazol-5-yl)-8-methyl-7-oxo-6-phenyl-2,3-dihydrothiazolo[3,2-a]pyrimidin-4-ium-5-olate A 50 mL, three necked flask equipped with magnetic stirrer, reflux condenser and thermo-pocket was charged with (E,4R)-4-(2-chlorothiazol-5-yl)-N-methyl-thiazoliclin-2-imine (0.34 g), toluene (2 mL) and heated to 110° C. under nitrogen atmosphere. Then bis(2,4,6-trichlorophenyl) 2-phenylpropanectioate (0.857 g) was added in lots into the reaction mass kept at 110° C. After stirring at 110° C. for 2h, H PLC showed >99% conversion. The reaction was cooled below 50° C. and the precipitated pale yellow colored solid was filtered through sintered funnel and then solid residue was washed with methyl tert-butyl ether (4 mL) and dried under vacuum to provide (3R)-3-(2-chlorothiazol-5-yl)-8-methyl-7-oxo-6-phenyl-2,3-dihydrothiazolo[3,2-a]pyrimidin-4-ium-5-olate (110 mg, m/z=378 amu (M+H$^+$) & 95.2% enantiomeric excess by chiral HPLC method 3). $^1$H NMR (300 MHz, DMSO-d6): 3.42(s, 3H), 3.94(d, J=12 Hz, 1H), 4.25-4.32(m, 1H), 6.48 (d, J=8.1 Hz, 1H), 7.06-7.11(m, 1H), 7.21-7.26(m, 2H), 7.6(d, J=7.5 Hz, 1H), 7.96(s, 1H).

The present invention is now illustrated in further details by the following examples.

Synergism can be described as an interaction where the combined effect of two or more compounds is greater than the sum of the individual effects of each of the compounds. The presence of a synergistic effect in terms of percent control or efficiacy, between two mixing partners (X and Y) can be calculated using the Colby equation (Colby, S. R., 1967, Calculating Synergistic and Antagonistic Responses in Herbicide Combinations, Weeds, 15, 20-22):

$$E = X + Y - \frac{XY}{100}$$

When the observed combined control effect is greater than the expected combined control effect (E), then the combined effect is synergistic.

The following tests can demonstrate the control efficacy of mixtures or compositions of this invention on specific pests and fungi. However, the pest control protection afforded by the compounds, mixtures or compositions is not limited to these species. In certain instances, combinations of a compound of this invention with other invertebrate pest control compounds or agents are found to exhibit synergistic effects against certain important invertebrate pests and/or harmful fungi.

The expected efficacies of active compound mixtures were determined using Colby's formula [R. S. Colby, "Calculating synergistic and antagonistic responses of herbicide combinations", Weeds 15, 20-22 (1967)] and compared with the observed efficacies.

Biological Examples of the Invention

If not otherwise specified, the test solutions are prepared as follows:

The active compound is dissolved at the desired concentration in a mixture of 1:1 (vol:vol) distilled water : actecone. The test solution is prepared at the day of use.

Test solutions are prepared in general at concentrations of 1000 ppm, 500 ppm, 300 ppm, 100 ppm and 30 ppm (wt/vol).

Test 1

For evaluating control of vetch aphid (*Megoura viciae*) through contact or systemic means the test unit consisted of 24-well-microtiter plates containing broad bean leaf disks. The mixtures were formulated using a solution containing 75% water and 25% DMSO. Different concentrations of formulated mixtures were sprayed onto the leaf disks at 2.5 μl, using a custom built micro atomizer, at two replications. For experimental mixtures in these tests identical volumes of both mixing partners at the desired concentrations respectively, were mixed together.

After application, the leaf disks were air-dried and 5-8 adult aphids placed on the leaf disks inside the microtiter plate wells. The aphids were then allowed to suck on the treated leaf disks and incubated at 23±1° C., 50±5% RH for 5 days. Aphid mortality and fecundity was then visually assessed.

Test 2

For evaluating control of Caenorhabditis elegans through contact or systemic means the test unit consisted of 96-well-microtiter plates containing a liquid diet.

The mixtures were formulated using a solution containing 75% water and 25% DMSO. Different concentrations of formulated mixtures were sprayed into the microtiter plate wells at 5 μl per well, using a custom built micro atomizer, at two replications. Mixed instar 60-100 *C. elegans* were transferred into the microtiter plate wells. For experimental mixtures in these tests identical volumes of both mixing partners at the desired concentrations respectively, were mixed together.

After application, the nematodes were incubated at 18±1° C., 70±5% RH for 4 days. Nematode motility (mortality) was then visually assessed.

Test 3

For evaluating control of green peach aphid (*Myzus persicae*) through systemic means the test unit consisted of 96-well-microtiter plates containing liquid artificial diet under an artificial membrane.

The mixtures were formulated using a solution containing 75% water and 25% DMSO. Different concentrations of formulated mixtures were pipetted into the aphid diet, using a custom built pipetter, at two replications. For experimental mixtures in these tests identical volumes of both mixing partners at the desired concentrations respectively, were mixed together.

After application, 5-8 adult aphids were placed on the artificial membrane inside the microtiter plate wells. The aphids were then allowed to suck on the treated aphid diet and incubated at 23±1° C., 50±5% RH for 3 days. Aphid mortality and fecundity was then visually assessed.

Test 4

For evaluating control of boll weevil (*Anthonomus grandis*) the test unit consisted of 24-well-microtiter plates containing an insect diet and 20-30 *A. grandis* eggs. The mixtures were formulated using a solution containing 75% water and 25% DMSO. Different concentrations of formulated mixtures were sprayed onto the insect diet at 20 μl, using a custom built micro atomizer, at two replications. For experimental mixtures in these tests identical volumes of both mixing partners at the desired concentrations respectively, were mixed together.

After application, microtiter plates were incubated at 23±1° C., 50±5% RH for 5 days. Egg and larval mortality was then visually assessed.

Test 5

For evaluating control of Mediterranean fruitfly (*Ceratitis capitata*) the test unit consisted of 96-well-microtiter plates containing an insect diet and 50-80 *C. capitata* eggs.

The mixtures were formulated using a solution containing 75% water and 25% DMSO. Different concentrations of formulated mixtures were sprayed onto the insect diet at 5 μl, using a custom built micro atomizer, at two replications. For experimental mixtures in these tests identical volumes of both mixing partners at the desired concentrations respectively, were mixed together.

After application, microtiter plates were incubated at 28±1° C., 80±5% RH for 5 days. Egg and larval mortality was then visually assessed.

Test 6

For evaluating control of tobacco budworm (*Heliothis virescens*) the test unit consisted of 96-well-microtiter plates containing an insect diet and 15-25 *H. virescens* eggs.

The mixtures were formulated using a solution containing 75% water and 25% DMSO. Different concentrations of formulated mixtures were sprayed onto the insect diet at 10 μl, using a custom built micro atomizer, at two replications. For experimental mixtures in these tests identical volumes of both mixing partners at the desired concentrations respectively, were mixed together.

After application, microtiter plates were incubated at 28±1° C., 80±5% RH for 5 days. Egg and larval mortality was then visually assessed.

Test 7

For evaluating control of yellow fever mosquito (*Aedes aegypti*) the test unit consisted of 96-well-microtiter plates containing 200 μl of tap water per well and 5-15 freshly hatched *A. aegypti* larvae.

The mixtures were formulated using a solution containing 75% water and 25% DMSO. Different concentrations of formulated mixtures were sprayed onto the insect diet at 2.5 μl, using a custom built micro atomizer, at two replications. For experimental mixtures in these tests identical volumes of both mixing partners at the desired concentrations respectively, were mixed together.

After application, microtiter plates were incubated at 28±1° C., 80±5% RH for 2 days. Larval mortality was then visually assessed.

Test 8

For evaluating control of Greenhouse Whitefly (*Trialeurodes vaporariorum*) the test unit consisted of 96-well-microtiter plates containing a leaf disk of egg plant leaf disk with white fly eggs. The mixtures were formulated using a solution containing 75% water and 25% DMSO. Different concentrations of formulated mixtures were sprayed onto the insect diet at 2.5 μl, using a custom built micro atomizer, at two replications.

For experimental mixtures in these tests identical volumes of both mixing partners at the desired concentrations respectively, were mixed together.

After application, microtiter plates were incubated at 23±1° C., 65±5% RH for 6 days. Mortality of hatched crawlers was then visually assessed.

The invention claimed is:

1. A pesticidal mixture comprising as active components
1) pesticidally active compound A of formula I:

(I)

and
2) at least one further compound B selected from
B1) 2-[3-ethylsulfonyl-6-(trifluoromethyl)imidazo[1,2-a]pyridin-2-yl]-3-methyl-6-(trifluoromethyl)imidazo[4,5-b]pyridine;
B2) 2-(6-chloro-3-ethylsulfonyl-imidazo[1,2-a]pyridin-2-yl)-3-methyl-6-(trifluoromethyl)imidazo[4,5-b]pyridine;
B3) 2-(6-bromo-3-ethylsulfonyl-imidazo[1,2-a]pyridin-2-yl)-3-methyl-6-(trifluoromethyl)imidazo[4,5-b]pyridine;
B4) 2-(3-ethylsulfonyl-6-iodo-imidazo[1,2-a]pyridin-2-yl)-3-methyl-6-(trifluoromethyl)imidazo[4,5-b]pyridine;
B5) 2-(3-ethylsulfonyl-7-iodo-imidazo[1,2-a]pyridin-2-yl)-3-methyl-6-(trifluoromethyl)imidazo[4,5-b]pyridine;
B6) 2-(7-chloro-3-ethylsulfonyl-imidazo[1,2-a]pyridin-2-yl)-3-methyl-6-(trifluoromethyl)imidazo[4,5-b]pyridine;
B7) 3-ethylsulfonyl-6-iodo-2-[3-methyl-6-(trifluoromethyl)imidazo[4,5-b]pyridin-2-yl]imidazo[1,2-a]pyridine-8-carbonitrile; 'B8) 2-[3-ethylsulfonyl-8-fluoro-6-(trifluoromethyl)imidazo[1,2-a]pyridin-2-yl]-3-methyl-6-(trifluoromethyl)imidazo[4,5-b]pyridine;
B9) 2-[3-ethylsulfonyl-7-(trifluoromethyl)imidazo[1,2-a]pyridin-2-yl]-3-methyl-6-(trifluoromethylsulfinyl)imidazo[4,5-b]pyridine;
B10) 2-[3-ethylsulfonyl-6-(trifluoromethyl)imidazo[1,2-a]pyridin-2-yl]-3-methyl-6-(trifluoromethyl)imidazo[4,5-c]pyridine;
B11) 2-[3-ethylsulfonyl-7-(trifluoromethyl)imidazo[1,2-a]pyridin-2-yl]-3-methyl-6-(trifluoromethyl)imidazo[4,5-c]pyridine;
B12) 2-[3-ethylsulfonyl-6-(1,2,4-triazol-1-yl)-2-pyridyl]-3-methyl-6-(trifluoromethyl)imidazo[4,5-b]pyridine;
B13) 2-[3-ethylsulfonyl-6-(1,2,4-triazol-1-yl)-2-pyridyl]-3-methyl-6-(trifluoromethyl)imidazo[4,5-b]pyridine;
B14) 2-[3-ethylsulfonyl-6-[3-(trifluoromethyl)-1,2,4-triazol-1-yl]-2-pyridyl]-3-methyl-6-(trifluoromethyl)imidazo[4,5-b]pyridine;
B15) 2-[3-ethylsulfonyl-5-(trifluoromethyl)-2-pyridyl]-3-methyl-6-(trifluoromethyl)imidazo[4,5-b]pyridine; and
B16) 2-[3-ethylsulfonyl-6-(1,2,4-triazol-1-yl)-2-pyridyl]-3-methyl-6-(trifluoromethyl)imidazo[4,5-c]pyridine;
B17) 4-chloro-2-[3-ethylsulfonyl-6-(1,2,4-triazol-1-yl)-2-pyridyl]-3-methyl-6-(trifluoromethyl)imidazo[4,5-c]pyridine;
B18) 2-[3-ethylsulfonyl-6-(1,2,4-triazol-1-yl)-2-pyridyl]-3-methyl-6-(trifluoromethyl)imidazo[4,5-c]pyridine-4-carbonitrile;
B19) 2-[3-ethylsulfonyl-6-(1,2,4-triazol-1-yl)-2-pyridyl]-3,4-dimethyl-6-(trifluoromethyl)imidazo[4,5-c]pyridine;
B20) Tetrachlorantraniliprole;
B21) Tyclopyrazoflor;
B22) N-[[2-fluoro-4-[(2S,3S)-2-hydroxy-3-(3,4,5-trichlorophenyl)-3-(trifluoromethyl)pyrrolidin-1-yl]phenyl]methyl]cyclopropanecarboxamide;
wherein compound A and compound B are present in a weight ratio of from 10000:1 to 1:10000.

2. The mixture according to claim 1, wherein the compound of formula I is non-racemic.

3. The mixture according to claim 1, wherein the compound of formula I is with enantiomeric excess of compound I-R-1.

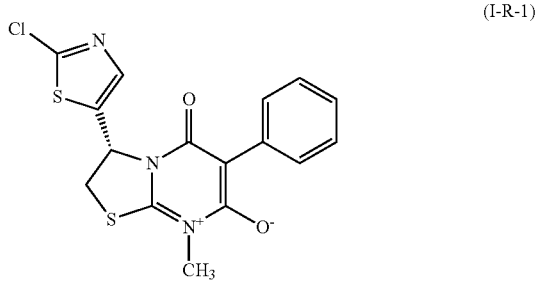

(I-R-1)

4. The mixture according to claim 3, wherein the compound of formula I is with at least 90% enantiomeric excess of the compound I-R-1.

5. The mixture according to claim 1, wherein the compound of formula I is the compound I-R-1.

6. The mixture according to claim 1 wherein compound B is selected from B1 to B11.

7. The mixture of claim 1, comprising the compound A and the active compound B in a weight ratio of from 20:1 to 1:20.

8. A composition comprising the pesticidal mixture according to claim 1 and at least one inert liquid and/or solid carrier.

9. An agricultural composition for combating animal pests comprising a pesticidal mixture according to claim 1 and at least one inert liquid and/or solid acceptable carrier and, optionally, at least one surfactant.

10. A method for combating or controlling invertebrate pests, comprising contacting said pest or its food supply, habitat or breeding grounds with a pesticidally effective amount of a pesticidal mixture according claim 1.

11. A method for protecting growing plants or plant propagation materials from attack or infestation by invertebrate pests, comprising contacting a plant, a plant propagation material or soil or water in which the plant is growing, with a pesticidally effective amount of a pesticidal mixture according to claim 1.

12. A method for protection of plant propagation material comprising contacting the plant propagation material with a pesticidal mixture according to claim 1 in an amount of from 0.1 g to 10 kg per 100 kg of plant propagation material.

13. The method according to claim 11, wherein the plant is rice plant and the invertebrate pest is selected from the group consisting of
Hemiptera,
Lepidoptera,
Coleoptera,
Diptera,
Thysanoptera,
Orthoptera;
Isoptera,
Hymenoptera,
Acari, and
Crustacea.

14. The method according to claim 13, comprising granular application, seedling box application, or foliar application.

15. Seed comprising a pesticidal mixture according to claim 1 in an amount of from 0.1 g to 10 kg per 100 kg of seed.

16. The method according to claim 13, wherein
the vertebrate pest of the order Hemiptera is selected from the group consisting of:
brown planthopper
small brown planthopper
white-backed planthopper
white leafhopper
green leafhopper selected from the group consisting of Nephotettix virescens, N. nigriceps, N. cincticeps, and N. malayanus
zig zag leafhopper
maize orange leafhopper
aster leafhopper
rice earhead bug selected from the group consisting of Leptocorisa oratorius and L. acuta
rice stink bugs selected from the group consisting of Nezara viridula, Pygomenida varipennis, Eysarcoris, Tibraca limbatriventris, and Eysarcoris ventralis
small stink bug selected from the group consisting of Oebalus poecilus and O. pugnax
coreid bug
chinch bug
rice mealybug selected from the group consisting of Brevennia rehi and Pseudococcus saccharicola
rice aphids selected from the group consisting of Rhopalosiphum rufiabdominalis, Macrosiphum avenae, Hysteroneura setariae and Tetraneuro nigriabdominalis; and
bean root aphid;
the invertebrate pest of the order Lepidoptera is selected from the group consisting of:
rice skipper selected from the group consisting of Parnara guttata and Melanitis leda ismene
rice stem borer/striped stem borer selected from the group consisting of Chilo suppressalis, Chilo polychrusus, Chilo partellus and Chilo plejadellus
rice stalk borer
pink rice borer
yellow rice borer
white rice borer
rice leafroller/leaf folder selected from the group consisting of Cnaphalocrocis medinalis, Marasmia patnalis, and M. exigua
rice ear-cutting caterpillar/armyworm
green caterpillar
green rice caterpillar
green horned caterpillars selected from the group consisting of Melanitis leda ismene and Mycalesis sp
fall army worm
cutworm
rice case worm
black hairy caterpillar
hairy caterpillar
yellow caterpillar
rice semi-brown looper
rice semi-looper
grass webworm
sugarcane borer
corn stalk borer
striped grass looper
european corn borer, and
Mexican rice borer;

the invertebrate pest of the order Diptera is selected from the group consisting of:
  stem maggot
  leafminer
  rice whorl maggot/rice stem maggot
  rice whorl maggot/small rice leafminer
  rice gall midge rice shoot fly; and
  rice seed midge selected from the group consisting of *Chironomus cavazzai, Chironomus* spp and *Cricotopus* spp;
the invertebrate pest of the order Thysanoptera is rice thrips selected from the group consisting of *Chloethrips oryzae, Stenochaetothrips biformis, Perrisothrips* sp., and *Hoplothrips* sp.;
the invertebrate pest of the order Orthoptera is selected from the group consisting of:
  rice grasshoppers selected from the group consisting of *Hieroglyphus banian, Hieroglyphus nigrorepletus, Catantops pinguis, Attractomorpha burri, A. crenulate, A. psittacina psittacina, A. Bedeli, Oxya adenttata, Oxya ebneri, Oxya hyla* intricate, and *Acrida turricata*
  locusts
  mole cricket
  field cricket selected from the group consisting of *Gryllus bimaculatus, Teleogryllus occipitalis* and *Euscyrtus concinus*; and
  katydid;
the invertebrate pest of the order Isoptera is termites selected from the group consisting of *Macrotermes gilvus* and *Syntermes molestans;*
the invertebrate pest of the order Hymenoptera is selected from the group consisting of:
  ants; and
  rice white tip nematode;
the invertebrate pest of the order Acari is rice panicle mite; and
the invertebrate pest of the order Crustacea is selected from the group consisting of:
  tadpole shrimp selected from the group consisting of *Triops longicaudatus.* and *T. cancriformis*; and
  rice crayfish selected from the group consisting of *Procambarus clarkii* and *Orconectes virilis.*

* * * * *